(12) United States Patent
Master et al.

(10) Patent No.: US 7,155,613 B2
(45) Date of Patent: Dec. 26, 2006

(54) APPARATUS, METHOD AND SYSTEM FOR GENERATING A UNIQUE HARDWARE ADAPTATION INSEPARABLE FROM CORRESPONDINGLY UNIQUE CONTENT

(75) Inventors: Paul L. Master, Sunnyvale, CA (US); John Watson, Edgewood, WA (US)

(73) Assignee: QST Holdings, LLC, Palo Alto, CA (US)

( * ) Notice: Subject to any disclaimer, the term of this patent is extended or adjusted under 35 U.S.C. 154(b) by 0 days.

(21) Appl. No.: 11/282,460

(22) Filed: Nov. 19, 2005

(65) Prior Publication Data

US 2006/0080532 A1    Apr. 13, 2006

Related U.S. Application Data

(63) Continuation of application No. 10/034,033, filed on Dec. 27, 2001, now Pat. No. 6,968,454.

(51) Int. Cl.
*G66F 1/24* (2006.01)
(52) U.S. Cl. ........................................ 713/182; 713/185
(58) Field of Classification Search ................ 713/182, 713/189, 193
See application file for complete search history.

(56) References Cited

U.S. PATENT DOCUMENTS 6,266,760 B1 * 7/2001 DeHon et al. ................ 712/15
6,282,627 B1 * 8/2001 Wong et al. ................... 712/15
6,408,039 B1 * 6/2002 Ito .............................. 375/347

\* cited by examiner

*Primary Examiner*—Thomas Peeso
(74) *Attorney, Agent, or Firm*—Nancy R. Gamburd; Gamburd Law Group LLC

(57) ABSTRACT

The present invention includes an apparatus, method and system for generating a configuration of an adaptive circuit which is inseparable from selected content. Either the adaptive circuit or encrypted, selected content has a unique identifier. In one of the preferred method and system embodiments in which the adaptive circuit has the unique identifier, a request for the selected content is received, along with the unique identifier, such as by a network server. The selected content is then encrypted, based upon the unique identifier, to form encrypted content. Configuration information for the adaptive circuit, corresponding to the unique identifier and the encrypted content, is generated to form corresponding configuration information. A service provider, such as through a network server, transfers the encrypted content and the corresponding configuration information to the adaptive circuit having the unique identifier, which may then be configured for use of the selected content. As a consequence, the present invention creates adaptive hardware configurations which are uniquely coupled to the selected content.

27 Claims, 14 Drawing Sheets

ADAPTIVE COMPUTING ENGINE (ACE)

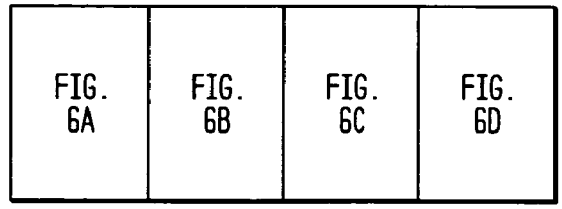
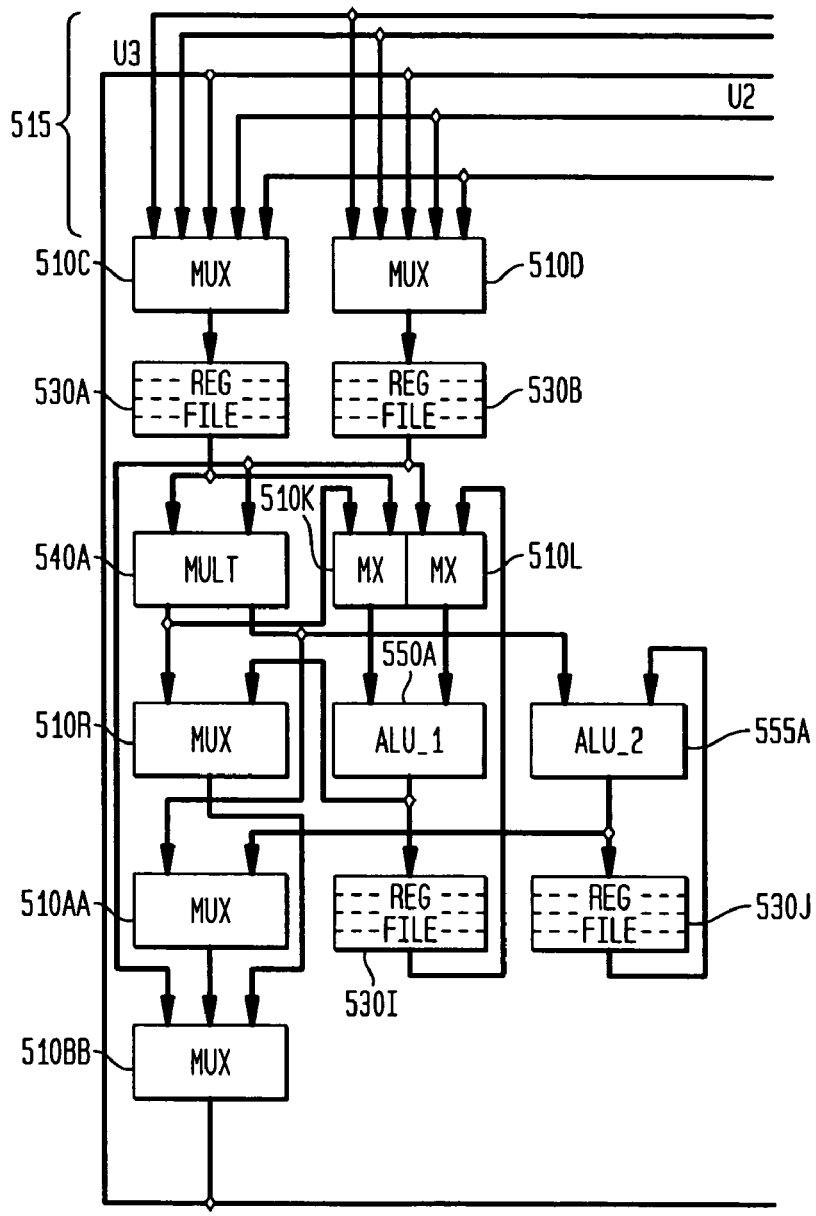

APPARATUS, METHOD AND SYSTEM FOR GENERATING A UNIQUE HARDWARE ADAPTATION INSEPARABLE FROM CORRESPONDINGLY UNIQUE CONTENT

CROSS-REFERENCE TO RELATED APPLICATIONS

This application is a continuation of and claims priority to Paul L. Master et al., U.S. patent application Ser. No. 10/034,033, filed Dec. 27, 2001, now U.S. Pat. No. 6,968,454 entitled "Apparatus, Method and System for Generating a Unique Hardware Adaptation Inseparable from Correspondingly Unique Content", the content of which is incorporated by reference herein, and which is commonly assigned herewith, with priority claimed for all commonly disclosed subject matter (the "parent application").

This application is also related to Paul L. Master et al., U.S. patent application Ser. No. 09/815,122, entitled "Adaptive Integrated Circuitry With Heterogeneous And Reconfigurable Matrices Of Diverse And Adaptive Computational Units Having Fixed, Application Specific Computational Elements", filed Mar. 22, 2001, commonly assigned to QuickSilver Technology, Inc., and incorporated by reference herein, with priority claimed for all commonly disclosed subject matter (the "first related application").

This application is also related to Paul L. Master et al., U.S. patent application Ser. No. 09/997,530, entitled "Apparatus, System and Method For Configuration Of Adaptive Integrated Circuitry Having Fixed, Application Specific Computational Elements", filed Nov. 30, 2001, commonly assigned to QuickSilver Technology, Inc., and incorporated by reference herein, with priority claimed for all commonly disclosed subject matter (the "second related application").

FIELD OF THE INVENTION

The present invention relates, in general, to integrated circuits and systems of integrated circuits. More particularly, the present invention relates to an apparatus, method and system for generating a unique hardware adaptation inseparable from correspondingly unique content. The hardware adaptation is a configuration of adaptive integrated circuitry having fixed, application specific computational elements, for the provision or creation of a functionality uniquely tailored to corresponding data or other content.

BACKGROUND OF THE INVENTION

The related application discloses a new form or type of integrated circuitry which effectively and efficiently combines and maximizes the various advantages of processors, application specific integrated circuits ("ASICs"), and field programmable gate arrays ("FPGAs"), while minimizing potential disadvantages. The related application illustrates a new form or type of integrated circuit ("IC"), referred to as an adaptive computing engine ("ACE"), which provides the programming flexibility of a processor, the post-fabrication flexibility of FPGAs, and the high speed and high utilization factors of an ASIC. This ACE integrated circuitry is readily adaptable (or reconfigurable), is capable of having corresponding, multiple modes of operation, and further minimizes power consumption while increasing performance, with particular suitability for low power applications, such as for use in hand-held and other battery-powered devices.

This ACE integrated circuitry, however, without something more, is essentially an empty or "blank" device. More particularly, configuration or adaptation information is required to generate, in advance or in real-time (or potentially at a slower rate), the adaptations and re-adaptations which provide and create one or more operating modes for the ACE circuit, such as wireless communication, radio reception, personal digital assistance ("PDA"), MP3 music playing, or any other desired functions. (As used herein, the terminology "adaptation" and "re-adaptation", is equivalent to and inclusive of terminology such as "configuration" and "reconfiguration", as used in the related applications and as utilized in the art.)

The second related application discloses a preferred system embodiment that includes an ACE integrated circuit coupled with one or more sets of configuration or adaptation information. This configuration or adaptation information is required and utilized to generate, in advance or in real-time (or potentially at a slower rate), the adaptations and re-adaptations which provide and create one or more operating modes for the ACE circuit, such as wireless communication, radio reception, PDA functions, MP3 or MP4 music playing, or any other desired functions. Various methods, apparatuses and systems are also illustrated in the second related application for generating and providing configuration or adaptation information for an ACE integrated circuit, for determining ACE reconfiguration or re-adaptation capacity or capability, for providing secure and authorized configurations, and for providing appropriate monitoring of configuration and content usage.

A new opportunity is presented, however, by this ability to provide a "blank" device, while independently (and possibly subsequently) providing a configuration or adaptation for its operating mode, and also while independently (and possibly subsequently) providing its data or other content, such as music, a novel, a report, video, multimedia, or any other type of content. This opportunity is to remove this independence and provide a novel inseparability or marriage of the "hardware" (namely, the blank device and its configuration) with corresponding content or other data.

This potential for a novel inseparability of hardware and content, as discussed in greater detail below, may provide many advantages in a digital, interconnected or "wired" world. For example, the provision of purportedly secure and copyrighted content, via DVD and its encryption technology, has proved to be readily decryptable, allowing corresponding copyright infringement, with substantive protection afforded only through non-technological means, such as through potential enforcement of the Digital Millenium Copyright Act, among other provisions.

As a consequence, a need remains for an apparatus, method and system having a capability for secure and authorized content transfer or transmission, which is not subject to readily available decryption methodologies.

SUMMARY OF THE INVENTION

The adaptive computing engine ("ACE") circuit of the present invention, for adaptive or reconfigurable computing, includes a plurality of differing, heterogeneous computational elements coupled to an interconnection network (rather than the same, homogeneous repeating and arrayed units of FPGAs). The plurality of heterogeneous computational elements include corresponding computational elements having fixed and differing architectures, such as fixed architectures for different functions such as memory, addition, multiplication, complex multiplication, subtraction, configuration, reconfiguration, control, input, output, routing, and field programmability. In response to configuration or adaptation information, the interconnection network is operative, in advance, in real-time or potentially slower, to adapt (or configure) and re-adapt (or reconfigure) the plurality of heterogeneous computational elements for a plurality of different functional modes, including linear algorithmic operations, non-linear algorithmic operations, finite state machine operations, memory operations, and bit-level manipulations. In turn, this adaptation and re-adaptation of heterogeneous computational elements, forming various computational units and adaptive matrices, generates the selected, higher-level operating mode of the ACE integrated circuit, for the performance of a wide variety of tasks, such as music or video playing, or display of a novel, other text or content.

The present invention utilizes this capability to provide an operating mode to a "blank" ACE device independently of the actual provision of the ACE device itself. More particularly, while the present invention independently (and possibly subsequently) provides a configuration or adaptation to a device for a selected device operating mode, the present invention provides a configuration or adaptation which is not independent from corresponding data or other content to be utilized by the device in the selected operating mode. For example, a unique configuration, such as for a unique decryption operating mode, is provided to uniquely correspond to particular content, such as a specific music composition or performance, a specific novel, a particular report, a certain video or other multimedia presentation, or any other type of content, which has been correspondingly uniquely encrypted. The present invention provides this novel inseparability or marriage of the "hardware" (namely, the blank device and its configuration (adaptation)) with corresponding content or other data.

The preferred system embodiment of the present invention includes such an ACE integrated circuit coupled with one or more sets of unique configuration or adaptation information. Other, higher-level system embodiments are also illustrated, including wireline and wireless devices, consumer and automobile electronics, network infrastructure equipment, and so on. This configuration information provides a selected operating (or functional) mode for the ACE; in the absence of such configuration or adaptation information, the ACE would be functionless.

The configuration information provided is unique to the particular ACE device, and further unique to the particular content provided. In the preferred embodiment, each ACE has a unique identifier or "fingerprint". This unique identifier is utilized, first, to encrypt selected content, forming unique content, and second, to correspondingly generate unique decryption configuration information for use only by the ACE having that unique identifier, providing that specific ACE with a decryption operating mode uniquely corresponding to the selected content. Other variations within the scope of the invention are also illustrated, including provision of the unique identifier with the selected content, and use of other types of configuration information, in addition to decryption configuration information.

Various apparatuses, methods and systems are illustrated for generating and providing this unique configuration information coupled with content for an ACE integrated circuit. As a consequence, both the content and the configuration of the particular ACE device are inherently non-transferable; namely, neither the content nor the configuration will operate or "play" on another device. As such, the present invention provides a technical methodology for, among other things, protection against unauthorized use and transmission of proprietary content, such as copyrighted music or performances.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
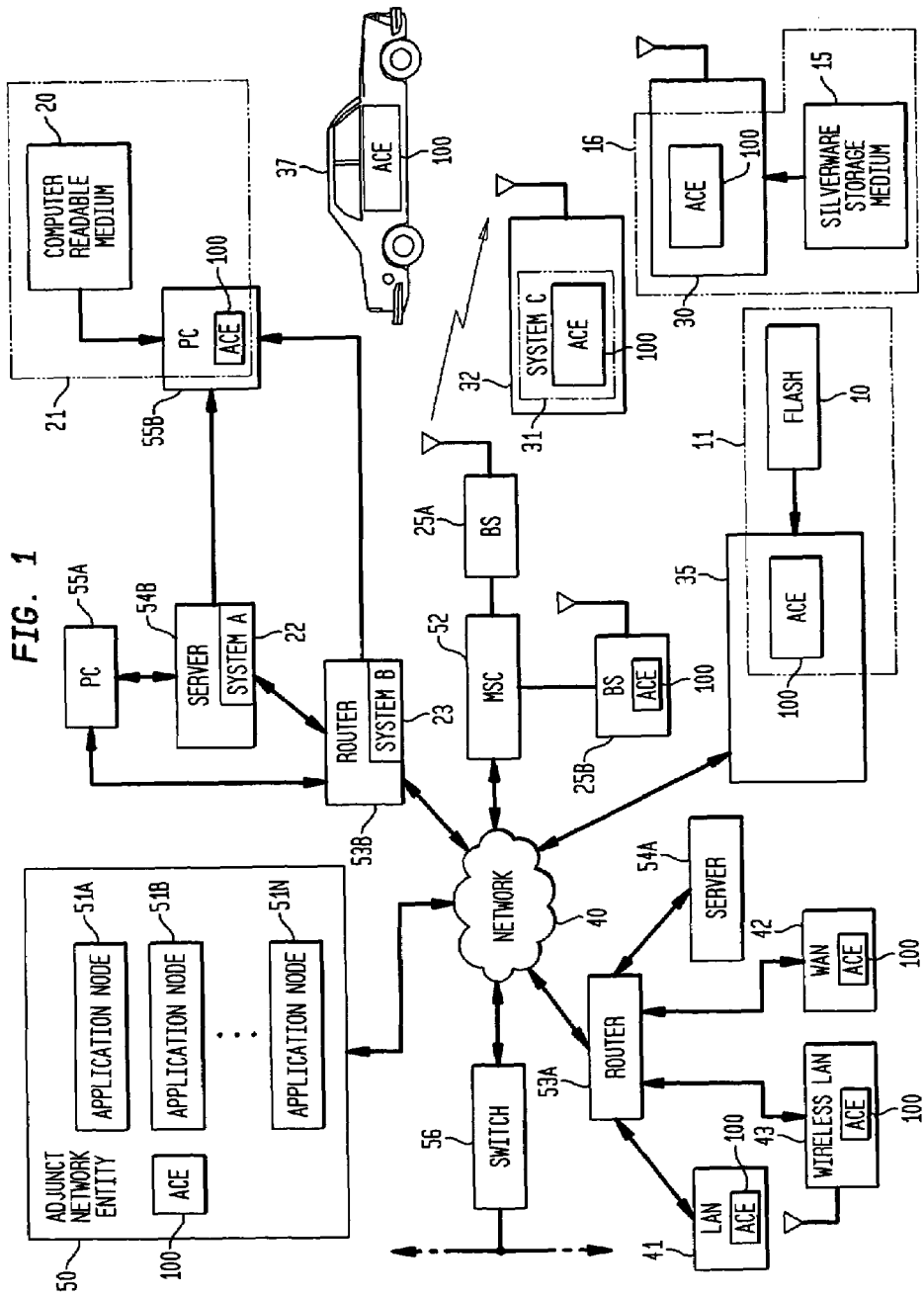
FIG. 1 is a block diagram illustrating a plurality of system embodiments in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As indicated above, a need remains for an apparatus, method and system having a capability for secure and authorized content transfer or transmission, which is not subject to readily available decryption methodologies. In accordance with the present invention, configuration information is provided which is unique to a particular adaptive computing engine (ACE) device, and further unique to the particular content provided. Various apparatuses, methods and systems are illustrated for generating and providing this unique configuration information coupled with content for an ACE integrated circuit. As a consequence of the present invention, both the content and the configuration of the particular ACE device are inherently non-transferable, with neither the content nor the configuration operable on another device. As such, the present invention provides a technical methodology for, among other things, protection against unauthorized use and transmission of proprietary content, such as copyrighted music or performances.

The apparatuses, systems and method of the present invention utilize a new form of integrated circuitry referred to as an ACE (adaptive computing engine). The ACE architecture utilizes a plurality of fixed and differing computational elements, such as (without limitation) correlators, multipliers, complex multipliers, adders, demodulators, interconnection elements, routing elements, combiners, finite state machine elements, reduced instruction set (RISC) processing elements, bit manipulation elements, input/output (I/O) and other interface elements, and the lower-level "building blocks" which form these units, which may be configured and reconfigured, in response to configuration information, to form the functional blocks (computational units and matrices) which may be needed, at any given or selected time, to perform higher-level functions and, ultimately, to execute or perform the selected operating mode, such as to perform wireless communication functionality.

As indicated above, the present invention utilizes this capability to provide an operating mode to a "blank" ACE device independently of the actual provision of the ACE device itself. More particularly, while the present invention independently provides a configuration to a device for a selected device operating mode, such as a decryption operating mode, the present invention provides a configuration (or adaptation) which is not independent from corresponding data or other content to be utilized by the device in the selected operating mode. For example, a unique configuration is provided to uniquely correspond to particular content, such as a specific music composition or performance, a specific novel, a particular report, a certain video or other multimedia presentation, or any other type of content. The present invention inseparably and irrevocably "marries" hardware (the blank device and its adaptation) with corresponding content or other data.

In the first and preferred embodiment of the present invention, every ACE device is provided with a unique identifier or other form of "fingerprint". When selected content is to be provided to the ACE device, such as through a download from a server, the ACE provides the server with its unique identifier. Using encryption technology, such as a "one-time pad" generated to correspond to the unique identifier, the content is uniquely encrypted, forming unique content. At the same time, also using the unique identifier and any corresponding function of the "one-time pad" or other encryption technology, unique decryption configuration information is generated. Both the unique content and the unique decryption configuration information are then provided to the particular ACE device. The ACE device, once configured by the unique decryption configuration information, is then uniquely enabled to decrypt the encrypted content and thereby utilize the selected content. Other devices, having different identifiers, are not able to be properly configured by this unique decryption configuration information and, therefore, are barred from use of the content.

Other variations are also illustrated. For example, a unique identifier may be provided with purchased content, such as a music collection purchased on FLASH or CDROM. In another variation, a decryption engine may be embedded in the particular ACE device; the unique configuration information which is generated corresponds to an operating mode enabling the ACE device to use the selected content, such as a video operating mode or a music operating mode.

The operation of the present invention is explained in greater detail with reference to FIGS. 1 and 2, and following the detailed ACE explanation of FIGS. 3 through 9, explained with reference to FIGS. 10 and 11.

FIG. 1 is a block diagram illustrating a plurality of system embodiments in accordance with the present invention. Referring to FIG. 1, as indicated above (and as discussed in greater detail below), the preferred system of the present invention consists of an ACE 100 coupled or combined with unique configuration (or adaptation) information inseparably coupled to particular content, and may be implemented in a wide variety of embodiments including, for example, within wireless devices 30 and 32, wireline device 35, computers 55, consumer electronics, automobile electronics 37, and network infrastructure equipment, such as servers 54, routers 53, local area network (LAN) 41, wireless LAN 43, wide area network (WAN) 42, adjunct network entity 50, switching systems 52 and 56, wireless base stations 25, and any other electronic device.

The terminology "content" or "data", as used herein, should be understood generally to have their broadest possible interpretations. For example, content or data may refer to anything substantive, anything having form, anything symbolic, or anything composed, authored or otherwise created by a person or machine, regardless of actual or potential protection or inclusion under applicable copyright laws or treaties. Examples may include, without limitation of the generality of the foregoing, books, music, photographic representation, videos, movies, films, reports, presentations, multimedia, and so on, including new forms of media which may arise in the future.

Similarly, the terminology "configuration information" (or, equivalently, "adaptation information"), as used herein, should be understood generally to have and include its linguistic, plural connotation, i.e., configuration information is a plurality of information bits, groups or sets of information, namely, a "plurality" of configuration information. For example, "configuration information" may be viewed as being a set of configuration information comprised of a plurality of subsets, such subsets being first configuration information, second configuration information, third configuration information, and so on, through nth configuration information. Although a subset of configuration information may be singular (one bit of information contained in the subset), each such subset of configuration information is also generally plural, typically including more information than may be encoded by a single bit, such as 8, 16, 32 or 64 information bits. It should also be noted that as used herein, the terminology "adaptation" and "re-adaptation", is equivalent to and is utilized interchangeably with terminology such as "configuration" and "reconfiguration".

The configuration (or adaptation) information may also exist in a variety of forms, and at any given time, may have a stored (or fixed) nature, or may have a transient or temporal nature. For example, as illustrated in FIG. 1, configuration information may be stored as a binary (bit) file in a flash memory 10 (for device 35) or in a computer or readable medium 20 (such as a CD-ROM, other optical drive, computer memory, hard drive or floppy disk) for computer 55B. As discussed in greater detail below, such configuration information may also be interdigitated, intertwined or otherwise combined with data or other content, forming what is referred to and defined herein as "silverware" or a "silverware" module, and stored as a binary (bit) file in a silverware storage media 15. The configuration (or adaptation) information may also occur transiently and across time, for example, when wirelessly downloaded from a base station 25A to a wireless device 32 (such as a mobile station or other mobile telephone) over an air interface, or when wireline downloaded from a server 54 to a computer (PC) 55.

Referring to FIG. 1 in greater detail, a plurality of networks are illustrated, including local area network ("LAN") 41, wireless LAN 43, wide area network ("WAN") 42, and, more generally, network 40, such as a public switched telephone network ("PSTN") or an internet. Coupled to the various networks are routers 53A and 53B, servers 54A and 54B, wireline switching center 56, mobile switching center ("MSC") 52, with further connection or couplability to wireless base stations (or other wireless transceivers) 25A and 25B, wireline device 35, computers 55A and 55B, and adjunct network entity 50. As known in the art, these various devices may be connected via trunking, optical and other signaling lines to each other and to broader networks (such as to a PSTN or internet), with multiple communication connections to other locations, such as providing a link to a satellite (not separately illustrated) and providing other wireless links (air interfaces). Router 53B, server 54B, base station 25B, and computer 55B are separately designated (with "B") to illustrate the potential inclusion of an ACE 100 (and the systems of the present invention) within such infrastructure equipment, and within LAN 41, WAN 42, wireless LAN 43, adjunct network entity 50, in addition to inclusion within consumer, automotive, and mobile electronics. Also, while the wireline and mobile switching centers 56 and 52 are usually physically separated due to regulatory and other historical or legacy reasons, these switching centers may also be combined into one or more switching centers having both wireline and wireless functionalities.

These various server, switching, routing and other entities may also be connected through network 40 to one or more intelligent network devices referred to as an adjunct network entities, such as adjunct network entity 50, which may be an additional type of server, database, a service control point ("SCP"), a service circuit node ("SCN") (also referred to as a service node ("SN")), an intelligent peripheral ("IP"), a gateway, or another intelligent network device. One or more adjunct network entities 50 are preferably connected or coupled to a network 40, for direct or indirect connection to wireline switching center 56, MSC 52, LAN 41, WAN 42, wireless LAN 43, routers 53 and servers 54. In the preferred embodiment, an adjunct network entity 50 provides a node or platform for particular applications ("application nodes") 51, illustrated as application nodes 51A, 51B through 51N, to perform various functions such as providing downloads of configuration (or adaptation) information uniquely married to specific content, authentication, encryption and other security, authorization, and compatibility evaluation. In addition to inclusion within an adjunct network entity 50, these various application nodes 51 may also be distributed among or included within the other various devices, such as within one or more servers 54. For example, one server 54 may be utilized to provide configuration information, with an adjunct network entity 50 utilized for content and encryption, with another adjunct network entity 50 utilized for authentication or other security, with tracking and accounting occurring at yet another server 54 or computer 55.

For purposes of explanation and not limitation, the various systems of the present invention, as illustrated in FIG. 1, include: system 11 (ACE 100 of wireline device 35 with unique configuration information correspondingly coupled to unique content in FLASH 10); system 16 (ACE 100 of wireless device 30 with unique configuration information correspondingly coupled to unique content in silverware storage medium 15); system 31 (ACE 100 of wireless device 32 with unique configuration information correspondingly coupled to unique content stored in a form of memory (separately illustrated in FIG. 2), such as RAM or a matrix interconnection network ('MIN'), discussed below; system 21 (ACE 100 of computer 55B with unique configuration information correspondingly coupled to unique content stored in computer readable medium 20; system 22 (ACE 100 of server 54B with unique configuration information correspondingly coupled to unique content stored in a form of memory (separately illustrated in FIG. 2); and system 23 (ACE 100 of router 53B with unique configuration information correspondingly coupled to unique content stored in a memory (separately illustrated in FIG. 2). As may be apparent, a system of the present invention may be embodied within any device or other article, in addition to those illustrated (e.g., LAN 41, WAN 42, wireless LAN 43 and adjunct network entity 50), which include both an ACE 100, content, and configuration information for the provision of a corresponding operating mode, and may otherwise be co-extensive with any particular apparatus or other embodiment.

Other network or distribution-level systems are also included within the scope of the present invention. Exemplary network systems may include one or more application nodes 51, in an adjunct network entity 50 or other server 54, which provide configuration (or adaptation) information or silverware modules (configuration information uniquely coupled with data) for use by an ACE 100. By storing such configuration and other information, such network or distribution level systems effectively store "hardware" on the "net". Such network or distribution level systems, in response to a request from or on behalf of an ACE 100, in the preferred embodiment, may provide one or more of the following: one or more sets of configuration information; content or other data modified for use with configuration information; unique configuration information correspondingly coupled to unique content; silverware modules combining configuration information with corresponding data or other content; configuration information tailored or watermarked for a unique device, and/or encryption of configuration information or silverware modules.

Distributed systems are also within the scope of the present invention, as configuration information does not need to be local to any given ACE 100 device. For example, configuration information or silverware may be stored across a network 40, such as between and among application nodes 51, adjunct network entity 50, other server 54, and the other illustrated elements of FIG. 1. For such distributed systems, the ACE 100 may only be configured, such as through an operating system ("OS"), to obtain the configuration (or adaptation) information uniquely coupled to content, such as through one of these network devices.

Figure 2:
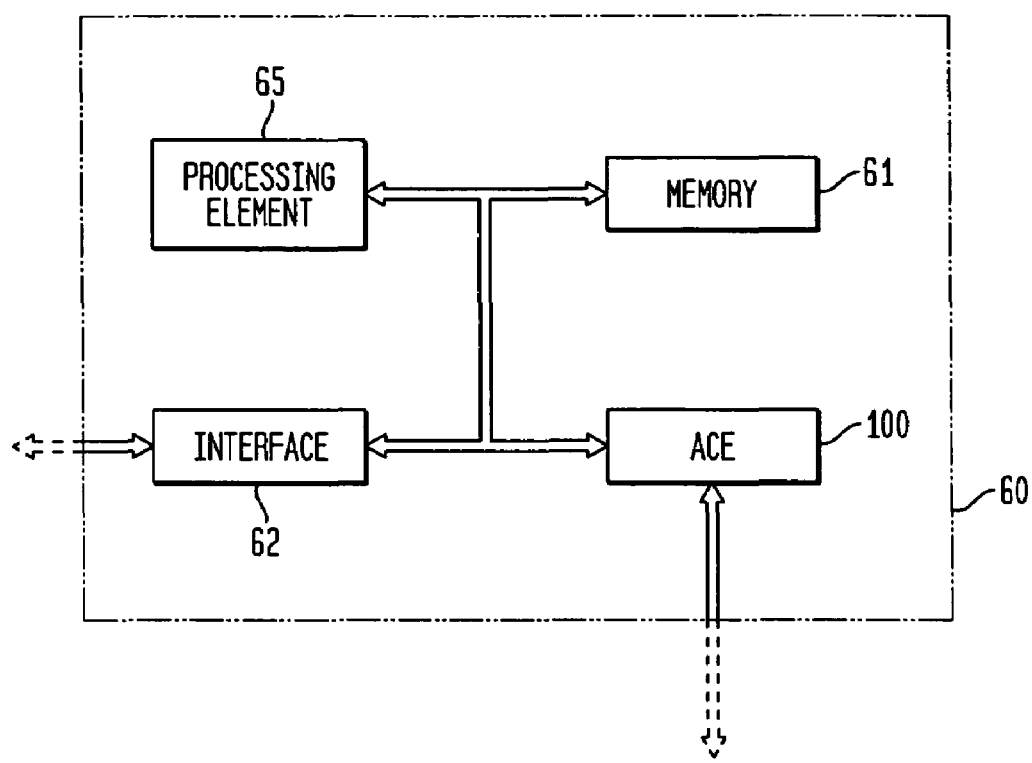
FIG. 2 is a block diagram illustrating an integrated system embodiment in accordance with the present invention.

FIG. 2 is a block diagram illustrating an integrated system embodiment 60 in accordance with the present invention. The system 60 is preferably implemented as a single integrated circuit (system on a chip or "SOC"). The system 60 includes an ACE 100, and may also include a memory 61, an interface 62 and one or more other processing elements 65. Such a system 60, for example, may be included within routers 53 and servers 54 of FIG. 1, or may be included within other embedded systems, such as within mobile stations or devices 30 and 32, wireline device 35, and so on. When the system 60 is comprised solely of an ACE 100, as discussed in greater detail below, that ACE 100 will generally be configured to include processing, interface and other I/O functionality, with memory configured either through memory computational elements or directly within the matrix interconnection network (MIN). The system 60, as illustrated in FIG. 2 with optional processing element 65, interface 62, and memory 61, will typically be implemented to provide backwards or retro-compatibility with existing or other legacy systems and devices.

The interface 62 is utilized for appropriate connection to a relevant channel, network or bus; for example, the interface 62 may provide impedance matching, drivers and other functions for a wireline interface, may provide demodulation and analog to digital conversion for a wireless interface, and may provide a physical interface for the memory 61 with other devices. In general, the interface 62 is used to receive and transmit data, depending upon the selected embodiment, such as voice information, configuration information, silverware modules, control messages, authentication data and other pertinent information. The ACE 100 may also be configured to provide the functionality of the interface 62, including internal IC I/O and external (off-chip) I/O, such as for PCI bus control. The memory 61 may be an integrated circuit or portion of an integrated circuit, such as various forms of RAM, DRAM, SRAM, MRAM, FeRAM, ROM, EPROM, $E^2$ PROM, flash, and so on. For non-IC (or non-SOC) embodiments, the memory 61 may also be a magnetic (hard of floppy) drive, an optical storage device, or any other type of data storage apparatus and, as indicated above, may be distributed across multiple devices. In addition, depending upon the selected embodiment, and as discussed in greater detail below, the memory 61 may also be included within the ACE 100, through memory computational elements or within the matrix interconnection network (MIN). One or more processing elements 65 optionally may be included within system 60, such as a form of microprocessor or digital signal processor ("DSP"), to provide any additional processing capability, such as reduced instruction set ("RISC") processing, or may be included as computational elements within the ACE 100.

The present invention may now be briefly explained with reference to FIGS. 1 and 2. First, a selected, unique identifier or "fingerprint" is provided to a specific, selected ACE 100. This unique identifier may be provided during fabrication, such as by using an etched identifier. Alternatively, the unique identifier may be stored in an ACE 100 or in a system 60 memory, such as a memory 61 embodied as a write-once memory (WOM) or as a read-only memory (ROM). Alternatively, the ACE 100 may self-generated such a unique identifier, for example, based upon fabrication processing variations (PVT variations), internal impedance measurements, timing changes, and so on. The unique identifier or fingerprint may have a wide variety of forms within the scope of the present invention, and may be as straightforward as a serial number or a public key. The only requirement of the selected identifier is that it be unique among ACE 100 devices. (Depending upon the chosen embodiment, decryption capability, based upon the unique identifier, may also be provided to or embedded within the selected ACE 100, for the second embodiment discussed below).

The unique identifier of the selected ACE 100 is then provided to a content and configuration (adaptation) information provider, which may be any kind of service provider, such as a server 54, application node 51, adjunct network entity 50, or any other network device. As indicated above, the content and (adaptation)information provider may be distributed across or between any number of the devices illustrated in FIG. 1. (It should be noted, however, that while the preferred embodiment is illustrated in a network 40 context, non-network embodiments are also within the scope of the invention, as discussed below). Utilizing the unique ACE identifier, the provider generates correspondingly unique configuration (adaptation) information and corresponding content. More particularly, the configuration information is generated such that it will only configure and run on an ACE 100 having the particular unique identifier, while the selected content is encrypted using an encryption methodology tied to or incorporating the unique identifier. This may be accomplished, for example, by utilizing particular, customized bit files within the configuration (adaptation) information, or by encryption, as discussed below. In the preferred embodiment, the unique configuration information is decryption configuration information, providing a decryption operating mode to the ACE 100 corresponding to the unique identifier, such that the ACE 100 so configured is uniquely able to decrypt the corresponding encrypted content. Similarly, the content is encrypted using the unique identifier, in such a way that it may only be decrypted by the ACE 100 device having the particular unique identifier.

This may be performed, for example, by encrypting the selected or desired content utilizing the unique identifier, or utilizing a function of or related to the unique identifier, and generating corresponding decryption configuration information which is operable only with that selected, unique identifier. Continuing with the example, such encryption may be a one-time pad form of encryption, or other methodologies, such as RSA or public key encryption. While important to the invention, the encryption technology employed need only correspond to a decryption capability based upon the unique identifier of the selected ACE 100. As a consequence, any number of forms of encryption may be utilized. In the preferred embodiment, a one-time pad methodology is used (with the one-time pad subsequently discarded by the provider).

In this first variation within the scope of the invention, using the unique identifier, the provider generates decryption configuration information corresponding to the unique identifier, and encrypts the content utilizing the unique identifier or a function of the unique identifier. When downloaded, the content may be decrypted through the decryption configuration information, but only by the ACE 100 having the unique identifier. More particularly, together with a unique decryption capability (configuration information) matched to the unique identifier of the selected ACE 100, the encrypted corresponding content is transferred to the selected ACE 100, such as through one of the wireline or wireless interfaces illustrated in FIG. 1. Utilizing its unique identifier and the unique decryption configuration information, the ACE 100 is configured or adapted for a decryption operating mode uniquely corresponding to the encrypted content, and may then decrypt and use the content. Again, in the preferred embodiment, the decryption is accomplished utilizing a one-time pad concept, with the corresponding key being designed specifically for one use only. The content may then be utilized with the corresponding configuration information, with any restrictions imposed by the content provider, such as a limitation on the number of times the content may be played or accessed.

Other variations of this methodology are also within the scope of the present invention. For example, decryption configuration information corresponding to the unique ACE identifier may be embedded in an ACE 100 operating system, or otherwise embedded or provided to an ACE 100. The selected content is correspondingly encrypted with the unique identifier, or more particularly, with a function or operation of the unique identifier. When supplied to the ACE 100 having the unique identifier and corresponding decryption capability, only that ACE 100 is capable of decrypting and utilizing that selected content.

In another variation, the unique configuration information which is provided to the ACE 100, which uniquely corresponds to the encrypted content, is the configuration information designed to provide the operating mode of the ACE 100 to actually use the specific, encrypted content. In this "content operating mode" variation, using the unique identifier, the provider generates ACE operating mode configuration information corresponding to the unique identifier, and encrypts the content utilizing a corresponding function of the unique identifier. When downloaded, the content and corresponding unique operating mode configuration information may be decrypted, through the embedded or supplied decryption configuration of the ACE 100 having the unique identifier. The operating mode configuration information may then be utilized to configure the ACE 100, and with that unique configuration, the content may be utilized by the ACE 100.

Another variation within the scope of the present invention is to provide a unique identifier with the selected content itself, rather than within the selected ACE 100. For example, encrypted content (such as a music collection) may be purchased by a consumer, stored on a FLASH 10 or medium 20, which includes a unique identifier or fingerprint for that particular copy of the included, encrypted content. Accessing a network device such as a server 54, or otherwise accessing a non-network service provider, the unique identifier is provided to the server 54, which then provides corresponding decryption configuration information which enables the selected ACE 100, when so configured, to decrypt the selected, encrypted content which solely has the unique identifier. Alternatively, the server 54 also may provide unique operating mode configuration information which enables the ACE 100 to utilize the content having the unique identifier, as mentioned above.

This concept of hardware "married" to content of the present invention also provides another interesting variation, namely, that the content may be played or perceived differently, depending upon the hardware. For example, particular musical content may be provided in such a way that, when played with the ACE 100 technology, it includes a "surround sound" feature, based upon the configuration (adaptation) of the ACE 100, which may not be available on another hardware device. As a consequence, the musical content may, in fact, sound better when played on the ACE 100 device.

As mentioned above, in addition to non-transferability, content providers may desire to implement other forms of restrictions on use of the content, such as limiting the number of plays or accesses of the content. For example, a user may purchase content with a license for 10 uses, with a license for 50 uses, or with a license for unlimited uses. This level of control may be implemented with the ACE 100 technology, for example, by providing for a changeable or malleable decryption configuration engine, which changes functionality after each use up to the number of allowed uses, or which ceases functioning after the occurrence of the corresponding number of licensed uses. With this methodology of the present invention, those of skill in the art will recognize additional and equivalent variations within the scope of the present invention.

The operation of the various systems illustrated in FIGS. 1 and 2 are also discussed in greater detail below with reference to FIGS. 10 and 11, following explanation of the ACE 100 architecture with reference to FIGS. 3–9.

Figure 3:
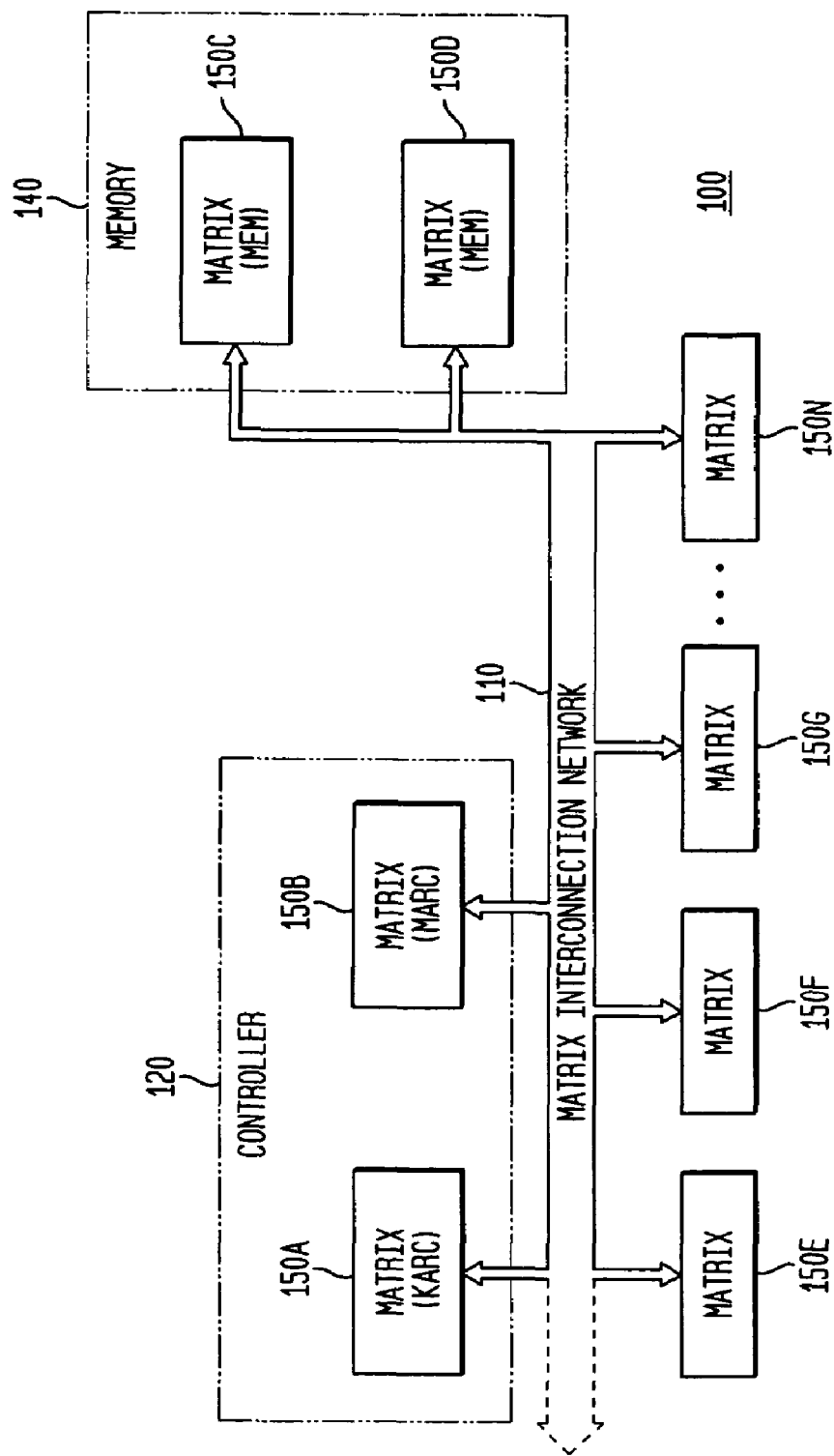
FIG. 3 is a block diagram illustrating a preferred adaptive computing engine (ACE) embodiment in accordance with the present invention.
Figure 4:
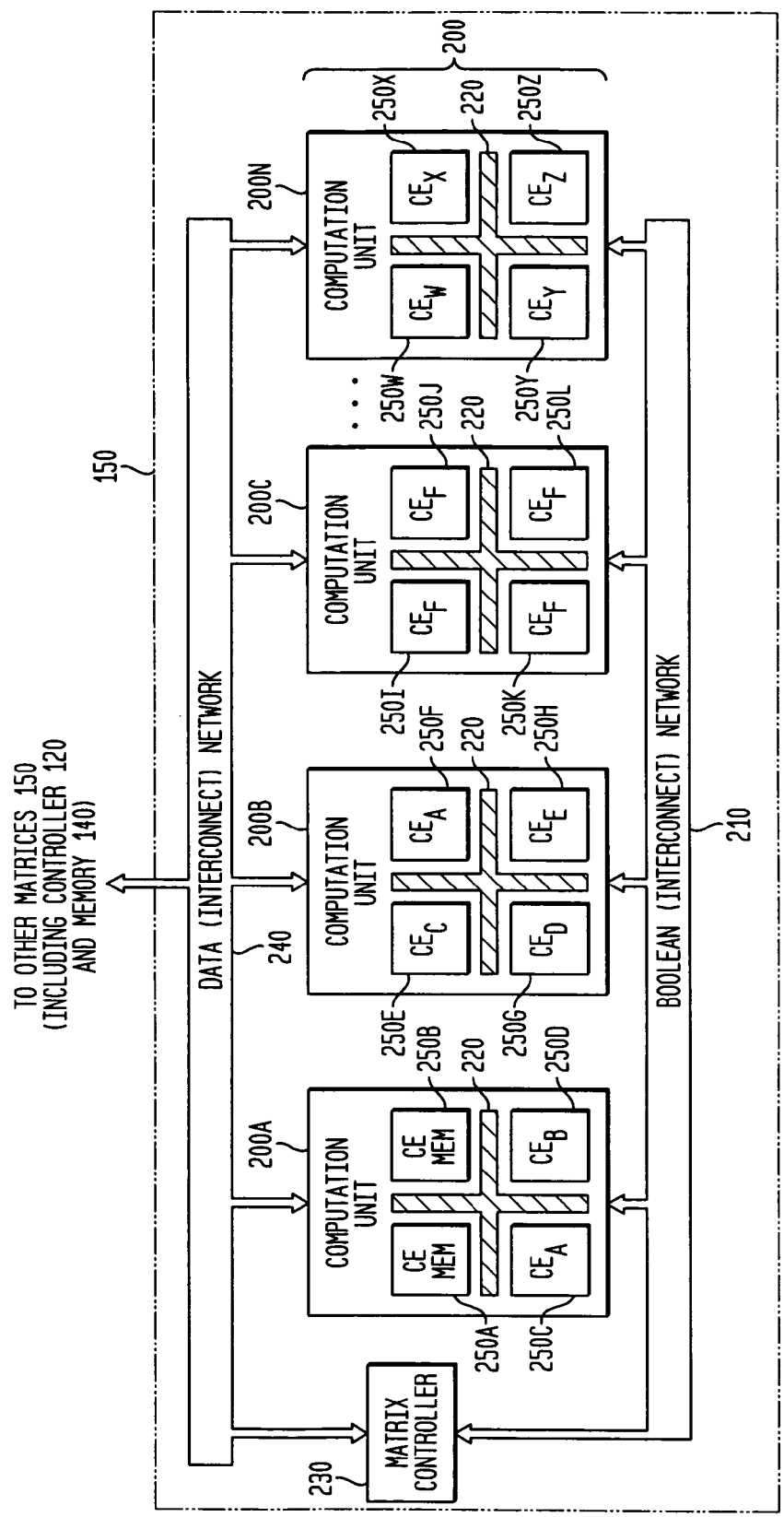
FIG. 4 is a block diagram illustrating a reconfigurable matrix, a plurality of computation units, and a plurality of computational elements, in accordance with the present invention.

FIG. 3 is a block diagram illustrating a preferred ACE apparatus 100 embodiment in accordance with the present invention. The ACE 100 is preferably embodied as an integrated circuit, or as a portion of an integrated circuit having other, additional components. (The ACE 100 is also described in detail in the related application.) In the preferred embodiment, and as discussed in greater detail below, the ACE 100 includes one or more reconfigurable matrices (or nodes) 150, such as matrices 150A through 150N as illustrated, and a matrix interconnection network (MIN) 110. Also in the preferred embodiment, and as discussed in detail below, one or more of the matrices 150, such as matrices 150A and 150B, are configured or adapted for functionality as a controller 120, while other matrices, such as matrices 150C and 150D, are configured or adapted for functionality as a memory 140. While illustrated as separate matrices 150A through 150D, it should be noted that these control and memory functionalities may be, and preferably are, distributed across a plurality of matrices 150 having additional functions to, for example, avoid any processing or memory "bottlenecks" or other limitations. Such distributed functionality, for example, is illustrated in FIG. 4. The various matrices 150 and matrix interconnection network 110 may also be implemented together as fractal subunits, which may be scaled from a few nodes to thousands of nodes.

A significant departure from the prior art, the ACE 100 does not utilize traditional (and typically separate) data, DMA, random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured (adapted or re-adapted), to provide any given connection between and among the reconfigurable matrices 150, including those matrices 150 configured as the controller 120 and the memory 140, as discussed in greater detail below.

It should also be noted that once configured or adapted, the MIN 110 also and effectively functions as a memory, directly providing the interconnections for particular functions, until and unless it is reconfigured. In addition, such configuration and reconfiguration may occur in advance of the use of a particular function or operation, and/or may occur in real-time or at a slower rate, namely, in advance of, during or concurrently with the use of the particular function or operation. Such adaptation and re-adaptation, moreover, may be occurring in a distributed fashion without disruption of function or operation, with computational elements in one location being configured while other computational elements (having been previously configured) are concurrently performing their designated function. This adaptation flexibility of the ACE 100 contrasts starkly with FPGA configuration, both which generally occurs comparatively slowly, not in real-time or concurrently with use, and which must be completed in its entirety prior to any operation or other use.

The matrices 150 configured to function as memory 140 may be implemented in any desired or preferred way, utilizing computational elements (discussed below) of fixed memory elements, and may be included within the ACE 100 or incorporated within another IC or portion of an IC (such as memory 61). In the preferred embodiment, the memory 140 is included within the ACE 100, and preferably is comprised of computational elements which are low power consumption random access memory (RAM), but also may be comprised of computational elements of any other form of memory, such as flash, DRAM, SRAM, MRAM, FeRAM, ROM, EPROM or $E^2$ PROM. As mentioned, this memory functionality may also be distributed across multiple matrices 150, and may be temporally embedded, at any given time, as a particular MIN 110 configuration. In addition, in the preferred embodiment, the memory 140 preferably includes direct memory access (DMA) engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor, such as a processing element 65 of FIG. 2.) This control functionality may also be distributed throughout one or more matrices 150 which perform other, additional functions as well. In addition, this control functionality may be included within and directly embodied as configuration information, without separate hardware controller functionality. The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the preferred form of combined data, configuration (and other control) information referred to herein interchangeably as "silverware" ("Agware") or as a "silverware" module.

Figure 5:
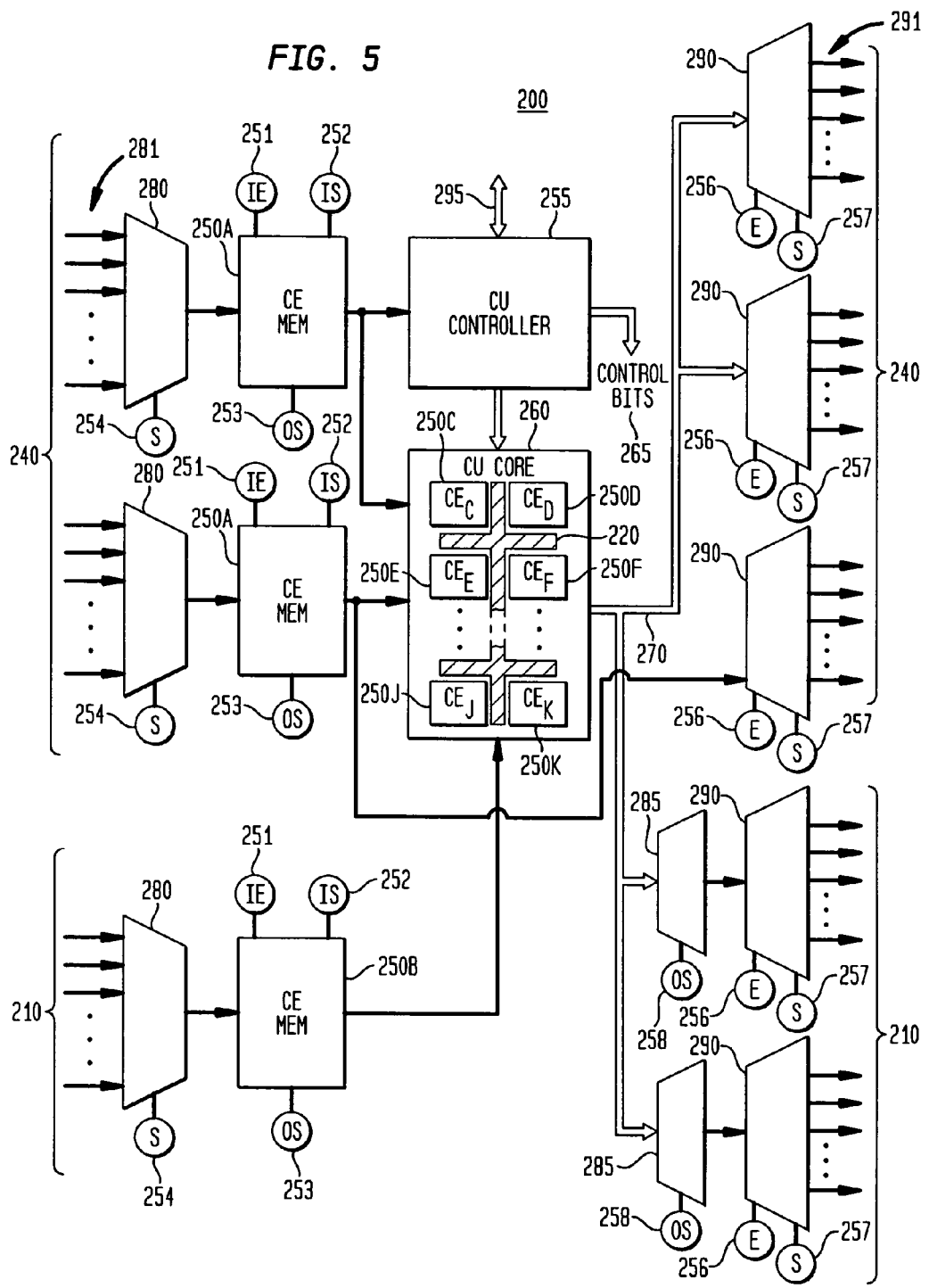
FIG. 5 is a block diagram illustrating, in greater detail, a computational unit of a reconfigurable matrix in accordance with the present invention.

The matrix interconnection network 110 of FIG. 3, and its subset interconnection networks separately illustrated in FIGS. 4 and 5 (Boolean interconnection network 210, data interconnection network 240, and interconnect 220), collectively and generally referred to herein as "interconnect", "interconnection(s)", "interconnection network(s)" or MIN, may be implemented generally as known in the art, such as utilizing field programmable gate array ("FPGA") interconnection networks or switching fabrics, albeit in a considerably more varied fashion. (As used herein, "field programmability" refers to the capability for post-fabrication adding or changing of actual IC functionality, as opposed to programming of existing IC structure or function (such as in a microprocessor or DSP). In the preferred embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166, and also as discussed below and as illustrated with reference to FIGS. 7, 8 and 9. These various interconnection networks provide selectable (or switchable) connections between and among the controller 120, the memory 140, the various matrices 150, and the computational units 200 and computational elements 250 discussed below, providing the physical basis for the configuration and reconfiguration referred to herein, in response to and under the control of configuration signaling generally referred to herein as "configuration information". In addition, the various interconnection networks (110, 210, 240 and 220) provide selectable, routable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses.

It should be pointed out, however, that while any given switching or selecting operation of or within the various interconnection networks (110, 210, 240 and 220) may be implemented as known in the art, the design and layout of the various interconnection networks (110, 210, 240 and 220), in accordance with the present invention, are new and novel, as discussed in greater detail below. For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable (re-adaptive) and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 4 and 5, which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail below.

Several different, insightful and novel concepts are incorporated within the ACE 100 architecture of the present invention, and provide a useful explanatory basis for the real-time operation of the ACE 100 and its inherent advantages.

One novel concept of the present invention concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 4) of the matrices 150, such as pluralities of multipliers, complex multipliers, and adders, each of which are designed for optimal execution of corresponding multiplication, complex multiplication, and addition functions. Through the varying levels of interconnect, corresponding algorithms are then implemented, at any given time, through the configuration and reconfiguration (adaptation and re-adaptation) of fixed computational elements (250), namely, implemented within hardware which has been optimized and configured for efficiency, i.e., a "machine" is configured or adapted in real-time which is optimized to perform the particular algorithm.

The next and perhaps most significant concept of the present invention, and a marked departure from the concepts and precepts of the prior art, is the concept of reconfigurable "heterogeneity" utilized to implement the various selected algorithms mentioned above. As indicated in the related application, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, in accordance with the present invention, within computation units 200, different computational elements (250) are implemented directly as correspondingly different fixed (or dedicated) application specific hardware, such as dedicated multipliers, complex multipliers, and adders. Utilizing interconnect (210 and 220), these differing, heterogeneous computational elements (250) may then be adaptively configured, in advance, in real-time or at a slower rate, to perform the selected algorithm, such as the performance of discrete cosine transformations often utilized in mobile communications. As a consequence, in accordance with the present invention, different ("heterogeneous") computational elements (250) are configured and reconfigured (adapted and re-adapted), at any given time, to optimally perform a given algorithm or other function, such as unique decryption. In addition, for repetitive functions, a given instantiation or configuration of computational elements may also remain in place over time, i.e., unchanged, throughout the course of such repetitive calculations.

The temporal nature of the ACE 100 architecture should also be noted. At any given instant of time, utilizing different levels of interconnect (110, 210, 240 and 220), a particular configuration (adaptation) may exist within the ACE 100 which has been optimized to perform a given function or implement a particular algorithm, such as to implement decryption methodologies, with a unique identifier, for particular content. At another instant in time, the configuration (adaptation) may be changed, to interconnect other computational elements (250) or connect the same computational elements 250 differently, for the performance of another function or algorithm, such as for a corresponding operating mode to utilize the decrypted content. Several additional, important features arise from this temporal re-adaptability. First, as indicated above, the unique configurations of the present invention may be implemented in a time- or use-limited fashion. Second, as algorithms may change over time to, for example, implement a new technology standard, the ACE 100 may co-evolve and be reconfigured to implement the new algorithm. Third, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors. This temporal reconfigurability also illustrates the memory functionality inherent in the MIN 110, as mentioned above.

This temporal reconfigurability of computational elements 250, for the performance of various different algorithms, also illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and reconfigurability, as used herein, includes the additional capability of adding or creating new functions which were previously unavailable or non-existent.

Next, the present invention also utilizes a tight coupling (or interdigitation) of data and configuration (or other control) information, within one, effectively continuous stream of information. This coupling or commingling of data and configuration information, referred to as "silverware" or as a "silverware" module, is the subject of another, second related patent application. For purposes of the present invention, however, it is sufficient to note that this coupling of data and configuration information into one information (or bit) stream, which may be continuous or divided into packets, helps to enable real-time reconfigurability of the ACE 100, without a need for the (often unused) multiple, overlaying networks of hardware interconnections of the prior art. For example, as an analogy, a particular, first configuration of computational elements at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements has occurred (i.e., is in place), as directed by (a first subset of) the configuration information, the data for use in the algorithm is immediately available as part of the silverware module. The same computational elements may then be reconfigured for a second period of time, as directed by second configuration information (i.e., a second subset of configuration information), for execution of a second, different algorithm, also utilizing immediately available data. The immediacy of the data, for use in the configured computational elements, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or digital signal processor ("DSP").

This use of silverware modules, as a commingling of data and configuration (adaptation) information, in conjunction with the reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities, such as a plurality of various decryption capabilities, each of which is unique to particular, encrypted content. In addition, these operating modes may change based upon the physical location of the device. Also for example, in accordance with the present invention, while configured for a first operating mode, using a first set of configuration information, as a CDMA mobile telephone for use in the United States, the ACE 100 may be reconfigured using a second set of configuration information for an operating mode as a GSM mobile telephone for use in Europe.

Referring again to FIG. 3, the functions of the controller 120 (preferably matrix (KARC) 150A and matrix (MARC) 150B, configured as finite state machines) may be explained with reference to a silverware module, namely, the tight coupling of data and configuration (adaptation) information within a single stream of information, with reference to multiple potential modes of operation, with reference to the reconfigurable matrices 150, and with reference to the reconfigurable computation units 200 and the computational elements 250 illustrated in FIG. 4. As indicated above, through a silverware module, the ACE 100 may be adapted or re-adapted to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In general, one of the plurality of matrices 150 is configured to decrypt such a module and verify its validity, for security purposes, in addition to the purposes of the present invention. Next, prior to any configuration or reconfiguration of existing ACE 100 resources, the controller 120, through the matrix (KARC) 150A, checks and verifies that the configuration or reconfiguration may occur without adversely affecting any pre-existing functionality, such as whether the addition of music functionality would adversely affect pre-existing mobile communications functionality. In the preferred embodiment, the system requirements for such configuration or reconfiguration are included within the silverware module or configuration information, for use by the matrix (KARC) 150A in performing this evaluative function. If the configuration or reconfiguration may occur without such adverse affects, the silverware module is allowed to load into the matrices 150 (of memory 140), with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 100.

Continuing to refer to FIG. 3, the matrix (MARC) 150B manages the scheduling of matrix 150 resources, clocking, and the timing of any corresponding data, to synchronize any configuration or reconfiguration of the various computational elements 250 and computation units 200 with any corresponding input data and output data. In the preferred embodiment, timing or other clocking information is also included within a silverware module or, more generally, within configuration (adaptation) information, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real-time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150.

FIG. 4 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250. As illustrated in FIG. 4, any matrix 150 generally includes a matrix controller 230, a plurality of computation (or computational) units 200, and as logical or conceptual subsets or portions of the matrix interconnect network 110, a data interconnect network 240 and a Boolean interconnect network 210. As mentioned above, in the preferred embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 4, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, utilizing the interconnect 220, the Boolean network 210, and the matrix interconnection network 110.

In the preferred embodiment, the various computational elements 250 are designed and grouped together, into the various adaptive and reconfigurable computation units 200 (as illustrated, for example, in FIGS. 5 through 9). In addition to computational elements 250 which are designed to execute a particular algorithm or function, such as multiplication, correlation, or addition, other types of computational elements 250 are also utilized in the preferred embodiment. As illustrated in FIG. 4, computational elements 250A and 250B implement memory, to provide local memory elements for any given calculation or processing function (compared to the more "remote" memory 140). In addition, computational elements 2501, 250J, 250K and 250L are configured to implement finite state machines (using, for example, the computational elements illustrated in FIGS. 7, 8 and 9), to provide local processing capability (compared to the more "remote" matrix (MARC) 150B), especially suitable for complicated control processing.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on (as illustrated below, for example, with reference to FIG. 6). A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 4 and as illustrated in greater detail below with respect to FIGS. 7 through 9), particularly useful for complicated control sequences, dynamic scheduling, and input/output management, while a fourth type may implement memory and memory management, such as computation unit 200A as illustrated in FIG. 4. Lastly, a fifth type of computation unit 200 may be included to perform bit-level manipulation, such as for encryption, decryption, channel coding, Viterbi decoding, and packet and protocol processing (such as Internet Protocol processing).

In the preferred embodiment, in addition to control from other matrices or nodes 150, a matrix controller 230 may also be included or distributed within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

FIG. 5 is a block diagram illustrating, in greater detail, an exemplary or representative computation unit 200 of a reconfigurable matrix 150 in accordance with the present invention. As illustrated in FIG. 5, a computation unit 200 typically includes a plurality of diverse, heterogeneous and fixed computational elements 250, such as a plurality of memory computational elements 250A and 250B, and forming a computational unit ("CU") core 260, a plurality of algorithmic or finite state machine computational elements 250C through 250K. As discussed above, each computational element 250, of the plurality of diverse computational elements 250, is a fixed or dedicated, application specific circuit, designed and having a corresponding logic gate layout to perform a specific function or algorithm, such as addition or multiplication. In addition, the various memory computational elements 250A and 250B may be implemented with various bit depths, such as RAM (having significant depth), or as a register, having a depth of 1 or 2 bits.

Forming the conceptual data and Boolean interconnect networks 240 and 210, respectively, the exemplary computation unit 200 also includes a plurality of input multiplexers 280, a plurality of input lines (or wires) 281, and for the output of the CU core 260 (illustrated as line or wire 270), a plurality of output demultiplexers 285 and 290, and a plurality of output lines (or wires) 291. Through the input multiplexers 280, an appropriate input line 281 may be selected for input use in data transformation and in the configuration and interconnection processes, and through the output demultiplexers 285 and 290, an output or multiple outputs may be placed on a selected output line 291, also for use in additional data transformation and in the configuration and interconnection processes.

In the preferred embodiment, the selection of various input and output lines 281 and 291, and the creation of various connections through the interconnect (210, 220 and 240), is under control of control bits 265 from the computational unit controller 255, as discussed below. Based upon these control bits 265, any of the various input enables 251, input selects 252, output selects 253, MUX selects 254, DEMUX enables 256, DEMUX selects 257, and DEMUX output selects 258, may be activated or deactivated.

The exemplary computation unit 200 includes a computation unit controller 255 which provides control, through control bits 265, over what each computational element 250, interconnect (210, 220 and 240), and other elements (above) does with every clock cycle. Not separately illustrated, through the interconnect (210, 220 and 240), the various control bits 265 are distributed, as may be needed, to the various portions of the computation unit 200, such as the various input enables 251, input selects 252, output selects 253, MUX selects 254, DEMUX enables 256, DEMUX selects 257, and DEMUX output selects 258. The CU controller 295 also includes one or more lines 295 for reception of control (or configuration) information and transmission of status information.

As mentioned above, the interconnect may include a conceptual division into a data interconnect network 240 and a Boolean interconnect network 210, of varying bit widths, as mentioned above. In general, the (wider) data interconnection network 240 is utilized for creating configurable and reconfigurable connections, for corresponding routing of data and configuration information. The (narrower) Boolean interconnect network 210, while also utilized for creating configurable and reconfigurable connections, is utilized for control of logic (or Boolean) decisions of data flow graphs (DFGs), generating decision nodes in such DFGs, and may also be used for data routing within such DFGs.

Figure 6B:
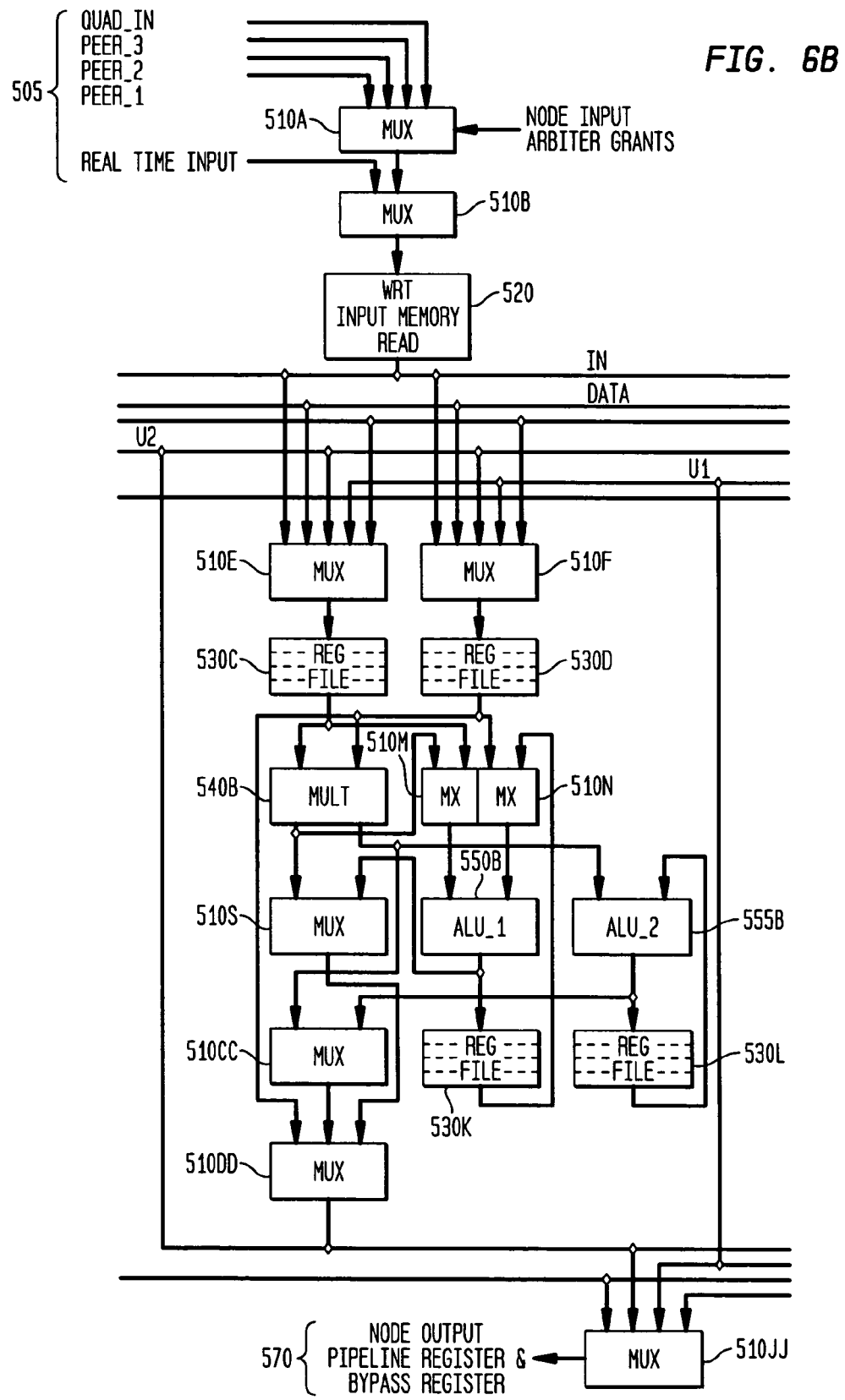
FIG. 6 is a block diagram illustrating, in detail, a preferred multi-function adaptive computational unit having a plurality of different, fixed computational elements, in accordance with the present invention.
Figure 6C:
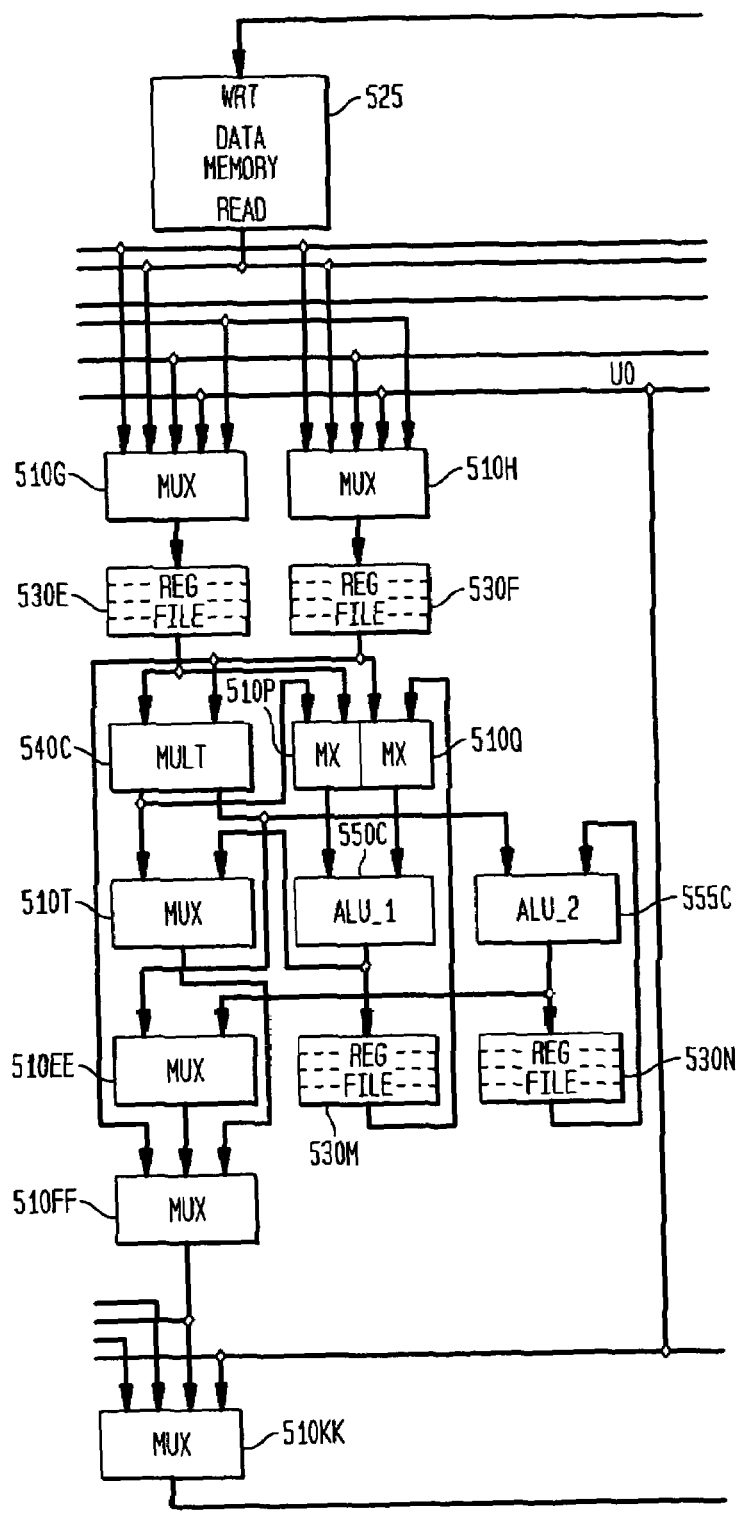
Figure 6D:
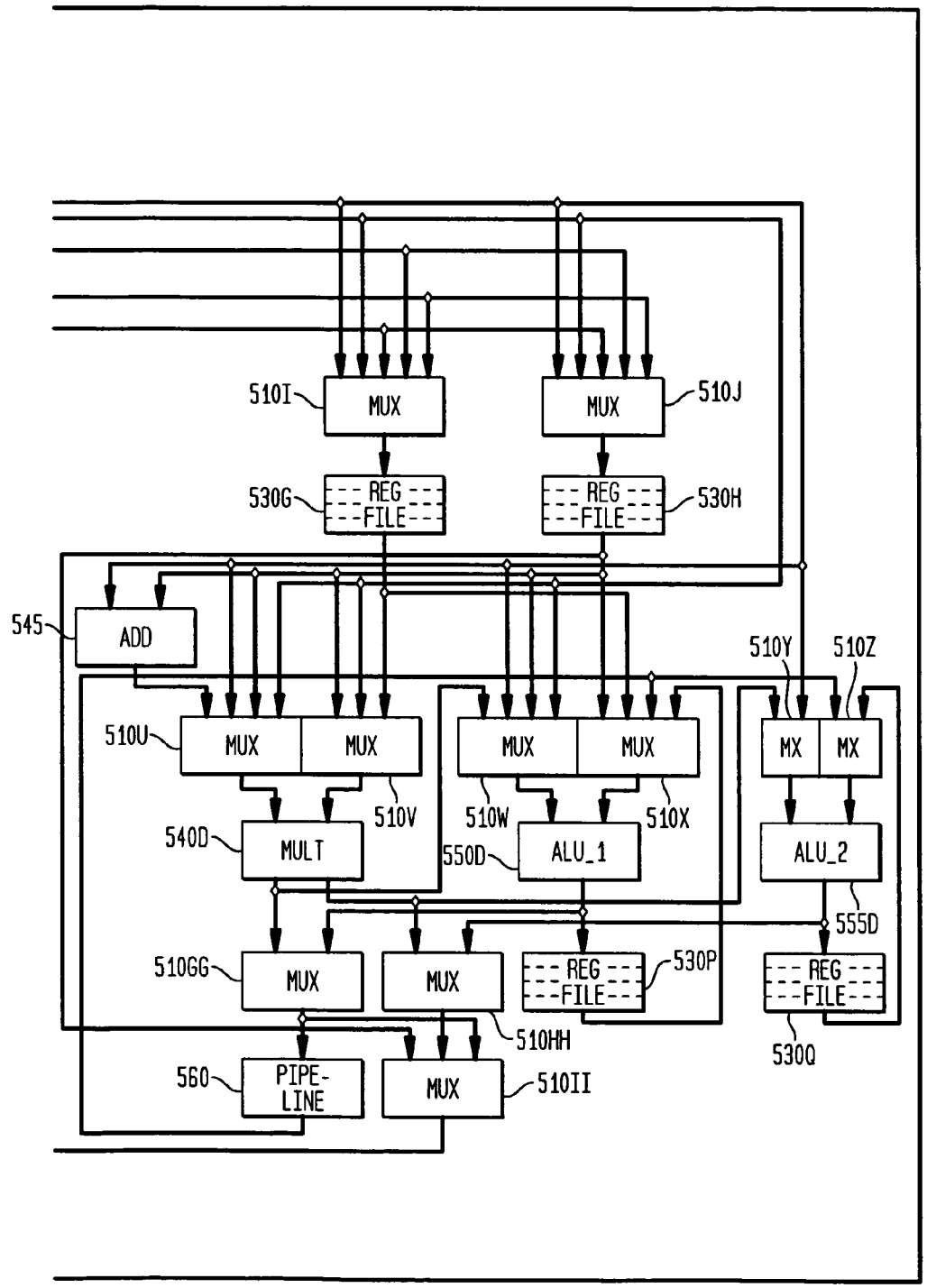

FIG. 6 is a block diagram illustrating, in detail, an exemplary, preferred multi-function adaptive computational unit 500 having a plurality of different, fixed computational elements, in accordance with the present invention. When configured accordingly, the adaptive computation unit 500 performs a wide variety of functions discussed in the related application, such as finite impulse response filtering, fast Fourier transformation, and other functions such as discrete cosine transformation, useful for communication operating modes. As illustrated, this multi-function adaptive computational unit 500 includes capability for a plurality of configurations of a plurality of fixed computational elements, including input memory 520, data memory 525, registers 530 (illustrated as registers 530A through 530Q), multipliers 540 (illustrated as multipliers 540A through 540D), adder 545, first arithmetic logic unit (ALU) 550 (illustrated as ALU_1s 550A through 550D), second arithmetic logic unit (ALU) 555 (illustrated as ALU_2s 555A through 555D), and pipeline (length 1) register 560, with inputs 505, lines 515, outputs 570, and multiplexers (MUxes or Mxes) 510 (illustrates as MUXes and MXes 510A through 510KK) forming an interconnection network (210, 220 and 240). The two different ALUs 550 and 555 are preferably utilized, for example, for parallel addition and subtraction operations, particularly useful for radix 2 operations in discrete cosine transformation.

Figure 7:
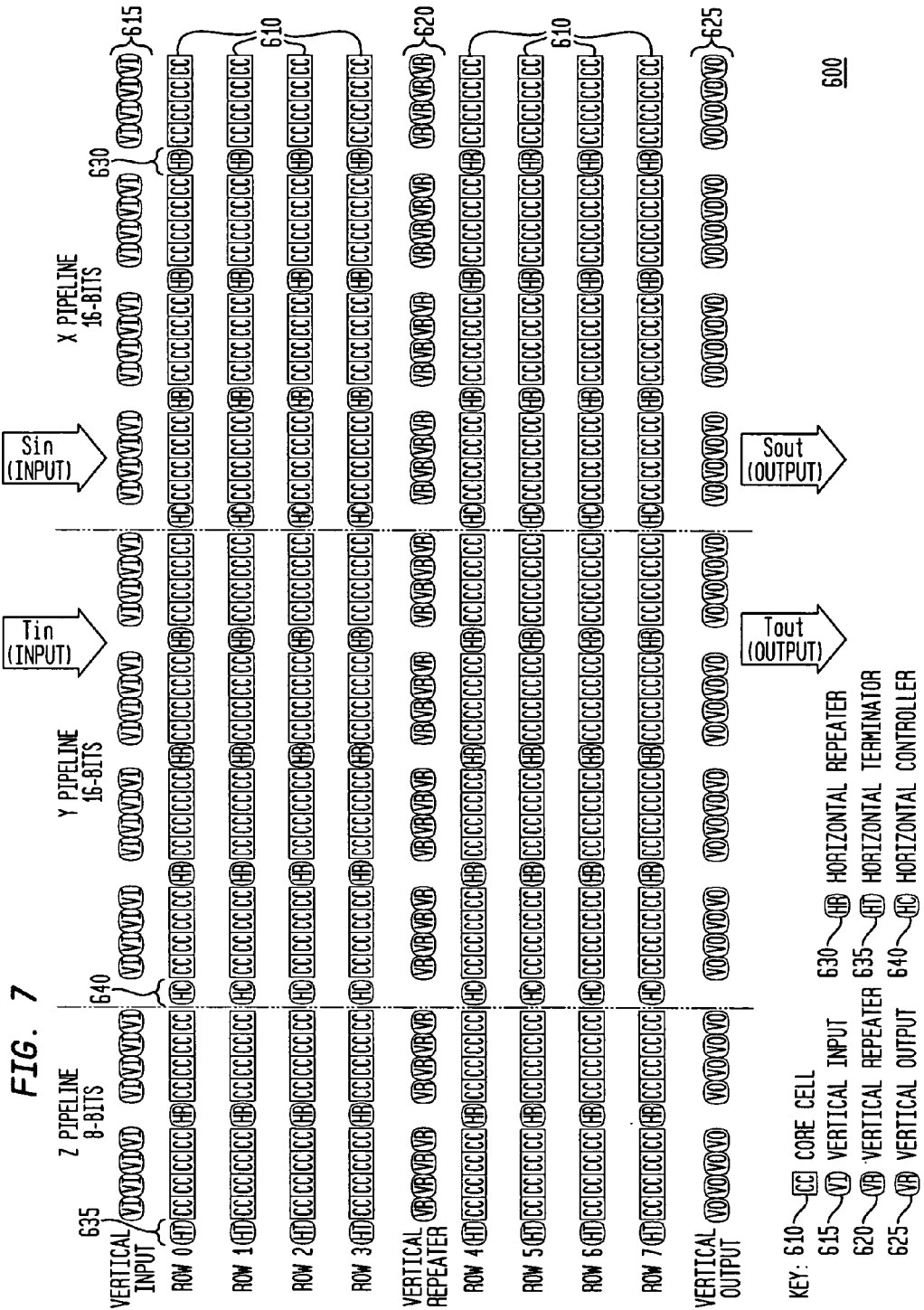
FIG. 7 is a block diagram illustrating, in detail, a preferred adaptive logic processor computational unit having a plurality of fixed computational elements, in accordance with the present invention.

FIG. 7 is a block diagram illustrating, in detail, a preferred adaptive logic processor (ALP) computational unit 600 having a plurality of fixed computational elements, in accordance with the present invention. The ALP 600 is highly adaptable, and is preferably utilized for input/output configuration, finite state machine implementation, general field programmability, and bit manipulation. The fixed computational element of ALP 600 is a portion (650) of each of the plurality of adaptive core cells (CCs) 610 (FIG. 8), as separately illustrated in FIG. 9. An interconnection network (210, 220 and 240) is formed from various combinations and permutations of the pluralities of vertical inputs (VIs) 615, vertical repeaters (VRs) 620, vertical outputs (VOs) 625, horizontal repeaters (HRs) 630, horizontal terminators (HTs) 635, and horizontal controllers (HCs) 640.

Figure 8:
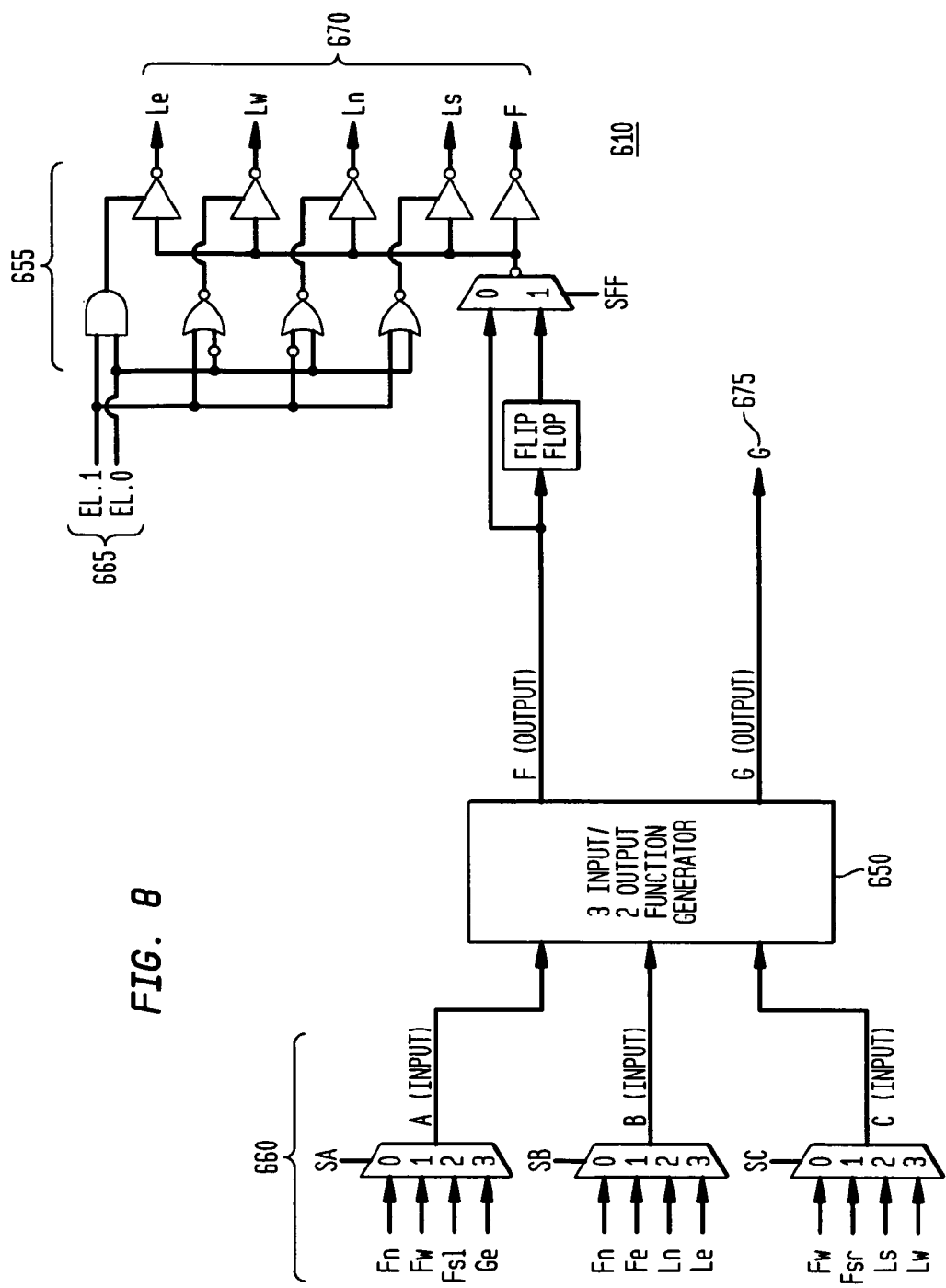
FIG. 8 is a block diagram illustrating, in greater detail, a preferred core cell of an adaptive logic processor computational unit with a fixed computational element, in accordance with the present invention.

FIG. 8 is a block diagram illustrating, in greater detail, a preferred core cell 610 of an adaptive logic processor computational unit 600 with a fixed computational element 650, in accordance with the present invention. The fixed computational element is a 3-input—2-output function generator 550, separately illustrated in FIG. 9. The preferred core cell 610 also includes control logic 655, control inputs 665, control outputs 670 (providing output interconnect), output 675, and inputs (with interconnect muxes) 660 (providing input interconnect).

Figure 9:
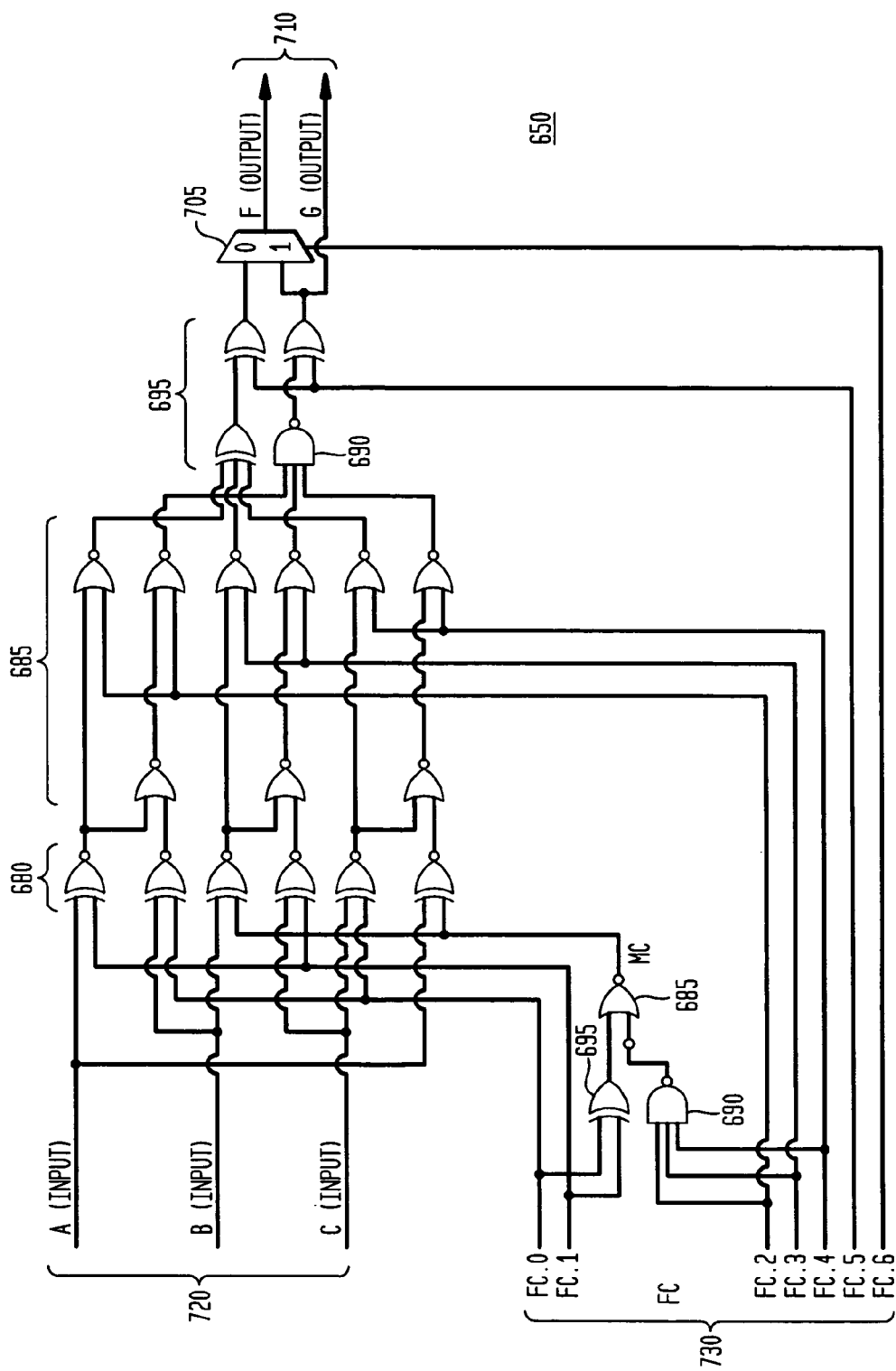
FIG. 9 is a block diagram illustrating, in greater detail, a preferred fixed computational element of a core cell of an adaptive logic processor computational unit, in accordance with the present invention.

FIG. 9 is a block diagram illustrating, in greater detail, a preferred fixed computational element 650 of a core cell 610 of an adaptive logic processor computational unit 600, in accordance with the present invention. The fixed computational element 650 is comprised of a fixed layout of pluralities of exclusive NOR (XNOR) gates 680, NOR gates 685, NAND gates 690, and exclusive OR (XOR) gates 695, with three inputs 720 and two outputs 710. Configuration and interconnection is provided through MUX 705 and interconnect inputs 730.

As may be apparent from the discussion above, this use of a plurality of fixed, heterogeneous computational elements (250), which may be adapted and re-adapted (configured and reconfigured) to form heterogeneous computation units (200), which further may be adapted and re-adapted (configured and reconfigured) to form heterogeneous matrices 150, through the varying levels of interconnect (110, 210, 240 and 220), creates an entirely new class or category of integrated circuit, which may be referred to interchangeably as an adaptive computing architecture or adaptive computing engine. It should be noted that the adaptive computing architecture of the present invention cannot be adequately characterized, from a conceptual or from a nomenclature point of view, within the rubric or categories of FPGAs, ASICs or processors. For example, the non-FPGA character of the adaptive computing architecture is immediately apparent because the adaptive computing architecture does not comprise either an array of identical logical units, or more simply, a repeating array of any kind. Also for example, the non-ASIC character of the adaptive computing architecture is immediately apparent because the adaptive computing architecture is not application specific, but provides multiple modes of functionality and is reconfigurable, preferably in real-time. Continuing with the example, the non-processor character of the adaptive computing architecture is immediately apparent because the adaptive computing architecture becomes configured, to directly operate upon data, rather than focusing upon executing instructions with data manipulation occurring as a byproduct.

Referring again to FIGS. 1 and 2, the various systems and methodology of the present invention may now be viewed in context of the ACE 100 architecture, based upon configuration and/or reconfiguration of fixed computational elements 250 in response to one or more sets of configuration information. Without the "something more" of configuration information, an ACE 100 is essentially or effectively an empty or "blank" device. Configuration (adaptation) information is necessary to generate the configurations (or adaptations) creating one or more operating modes for the ACE 100, in order to provide a desired functionality and operate upon corresponding data, such as wireless communication, radio reception, MP3 music playing, or in the case of the present invention, decryption capability (or another operating mode) unique to and inseparable from particular content.

Such adaptation and re-adaptation may occur in a wide variety of ways. For example, an entire ACE 100 may be configured in advance of any particular use, such as preconfigured as a mobile communication device. In other embodiments, an ACE 100 may be configured to have an operating system, to power on (boot), and obtain and load other configurations for particular operating modes and functions, such as through a network 40. An ACE 100 may also be partially configured, with some matrices 150 configured and operating, while other matrices 150 are being configured for other functions.

As mentioned above, such configuration information may be interleaved with data to form silverware (or a silverware module). In addition, such configuration information may also be separate from any data (effectively distributing a silverware module across time). For example, (encrypted) data or content may be provided, and a set of configuration information separately (or subsequently) provided to an ACE 100 for a first operating mode, such as for decryption capability. The various controller 120 functions of the ACE 100 then interleave the appropriate subsets of configuration information with corresponding data to provide silverware modules to the matrices 150. As mentioned above, such controller functions may be distributed within the various matrices 150, may be included within an operating system, or may be embedded within the configuration information itself.

Referring to FIG. 1, an ACE 100 may obtain unique configuration (adaptation) information correspondingly coupled to unique content from a plurality of sources. As illustrated in FIG. 1, unique configuration information correspondingly coupled to unique content may be provided to an ACE 100 through a download, from a server 54, WAN 42, LAN 41, or adjunct network entity 50, via a network 40 (with any applicable intervening switches 56 and 52 and base stations 25) or via a router 53, for example. The download may be either wireline (e.g. twisted pair, optical fiber, coaxial cable, hybrid fiber-coax) or wireless, such as through a transceiver of a base station 25 or satellite (not illustrated) or wireless LAN 43. The unique configuration (or adaptation) information correspondingly coupled to unique content may also be provided to an ACE 100 through other media, such as a flash memory 10, a silverware storage medium 15, a computer or other machine-readable medium 20, PCMCIA cards, PDA modules, or other memory cards, for example. Operating mode configuration information, in the preferred ACE 100 embodiment, is stored in memory 140, distributed memory within the various matrices 150, or in the system 60 (SOC) embodiment, may also be stored in memory 61. In contrast, decryption configuration information is generally stored only in a write-once memory, or is discarded after a one-time use. Configuration (adaptation) information may also simply be stored as an actual configuration of the matrices 150, with the MIN 110 effectively functioning as memory. The configuration information may also be transient, distributed and received in real-time for a particular application or for a singular use. Other equivalent provisioning and storage means will be apparent to those of skill in the art. (An ACE 100 receiving configuration information, through a download or other medium, is generally referred to herein as a "receiving" ACE.)

In addition, a need or request for such adaptation (configuration) information may also arise from a plurality of sources, including a system user, an element of infrastructure, an ACE 100, another device including an ACE 100, or an independent device. For example, a system user may request a download of new configuration information to upgrade a device to a new standard, or may purchase a memory module (such as flash 10 or silverware storage medium 15) containing new configuration (adaptation) information for playing additional, copyrighted MP3 music, or containing selected, encrypted content. Infrastructure elements may also initiate downloads of new configurations (adaptations), either transmitted to an individual ACE 100 device (a single user, with a one-to-one (1:1) correspondence of provider and receiver) or broadcast to many ACE 100 devices (multiple users, with a one-to-many (1:many) correspondence of provider and receivers), to provide system upgrades, to adapt to new standards, or to provide other, real-time performance enhancements.

Another novel element of the present invention concerns a configuration or reconfiguration request generated by an ACE 100 itself (or another device including an ACE 100) providing, among other things, mechanisms for self-modification and self-adaptation. For example, an ACE 100 may request a decryption operating mode, through corresponding configuration information, which corresponds to particular content with a unique identifier.

As indicated above, configuration or adaptation information is generally plural, consisting of a plurality of subsets of configuration or adaptation information, such as first configuration information, second configuration information, through $n^{th}$ configuration information. One "set" of configuration or adaptation information may be considered to correspond to a particular operating mode of the ACE 100. For example, a first set of configuration information may provide a decryption operating mode, while a second set of configuration information may provide content operating mode, such as an MP3 player operating mode.

Also as indicated above, for a given or selected higher-order operating mode of an ACE 100 (or, equivalently, for a given or selected set of configuration information), the various fixed, heterogeneous computational elements 250 are correspondingly configured and reconfigured for various lower-level or lower-order functional modes in response to the subsets of the configuration information, such as configuration for discrete cosine transformation in response to first configuration information and reconfiguration for fast Fourier transformation in response to second configuration information.

The configuration or adaptation information may also have different forms. In one embodiment, configuration information may include one or more discrete packets of binary information, which may be stored in memory 140, distributively stored within the matrices 150, or directly stored as a configuration of MIN 110. Configuration (adaptation) information may also be embodied in a continuous form, such as a continuous stream of binary or other information. As directed, configuration and other control bits from the configuration information are interdigitated with data to form silverware modules, for use in real-time within an ACE 100. In another embodiment, configuration (adaptation) information may be provided in real-time with corresponding data, in the form of a continuous stream (continuous for the duration of the selected function). For example, configuration information for a MP3 player may be provided in real-time in a silverware stream with the data bit file for the music to be played.

Various forms of monitoring, tracking and other record keeping are also utilized for determining and accounting for the various configuration and content usage possibilities, and may involve numerous different network entities. For example, a particular download of configuration (adaptation) information may be generated from more than one network entity, with one transaction for a particular download of configuration information also distributed across more than one network entity. Continuing with the example, a request for a download of configuration information (or silverware) may be received at a base station 25 of a wireless service provider "A". To fulfill the request, the wireless service provider "A" determines the authorization status of the requesting ACE 100 and when authorized, forwards the request to another provider, such as content provider "B", which provides requested data, such as a music bit file, using a content server 54. Also in response to the request from provider "A", a set of MP3 configuration information or decryption configuration information is simultaneously provided by configuration provider "C", using a second, different server 54 under its control, such as a configuration information server. The content (data) and configuration information are provided to silverware provider "D", who in turn interleaves the data and configuration to form a silverware module, using a first adjunct network entity 50 having a silverware module application node 51. Next, an encryption provider "E" further or additionally encrypts the silverware module, using a second adjunct network entity 50 having an encryption application node 51, providing the encrypted silverware module to the service provider "A" for transmission to the requesting ACE 100. Corresponding accounting and other records may be generated for each such distributed transaction, with corresponding distributions of royalties, use and license fees. Content usage may also be tracked by, for example, a content server.

The generation and provision of adaptation (configuration) information may also be distributed across time, in addition to distributed across space, with the various functions referred to above (and also discussed below with reference to FIG. 10) performed during different intervals of time. For example, one or more versions or sets of configuration (adaptation) information may be generated and stored during a first predetermined period of time, such as in advance of any particular use. Subsequently, such a set of configuration (adaptation) information may be provided during a second predetermined period of time, such as following a security and financial authorization process.

Figure 10:
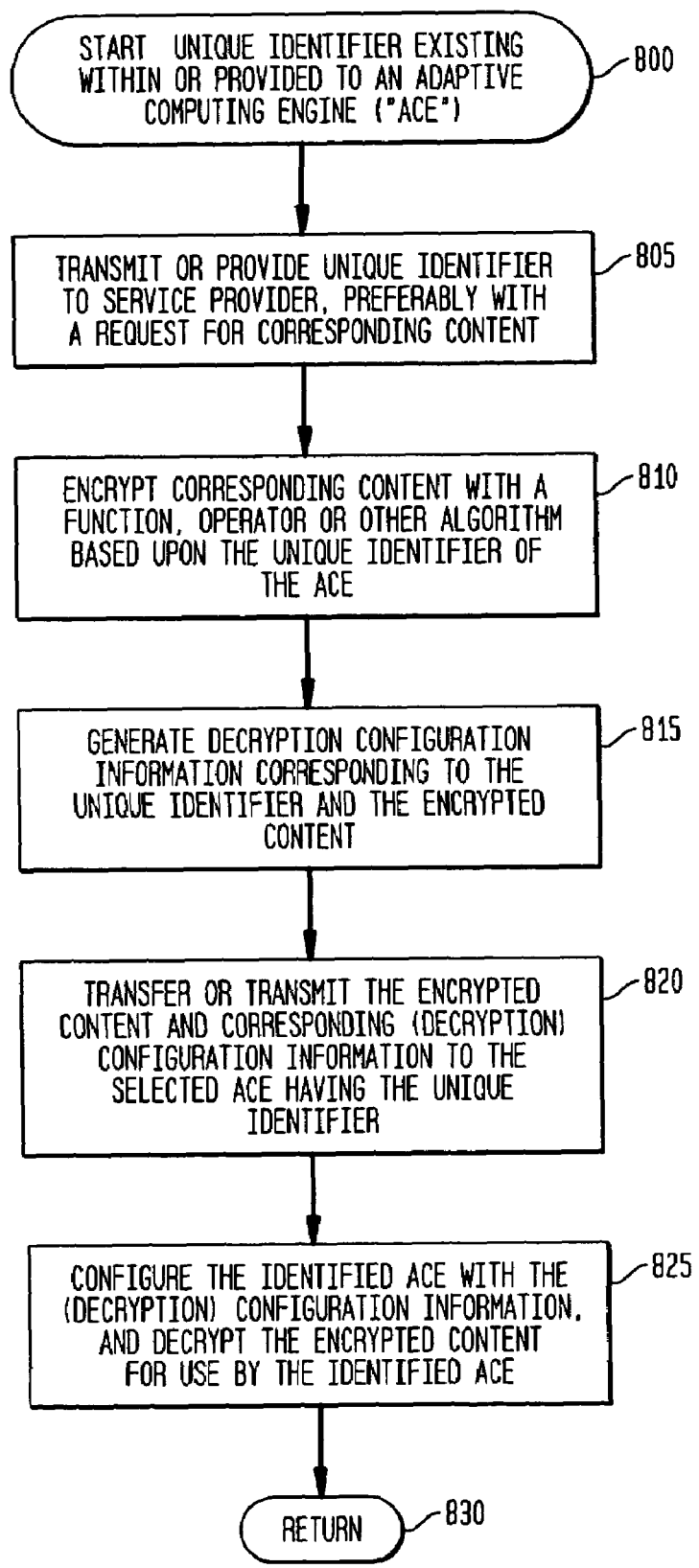
FIG. 10 is a flow diagram illustrating a first method embodiment in accordance with the present invention.
Figure 11:
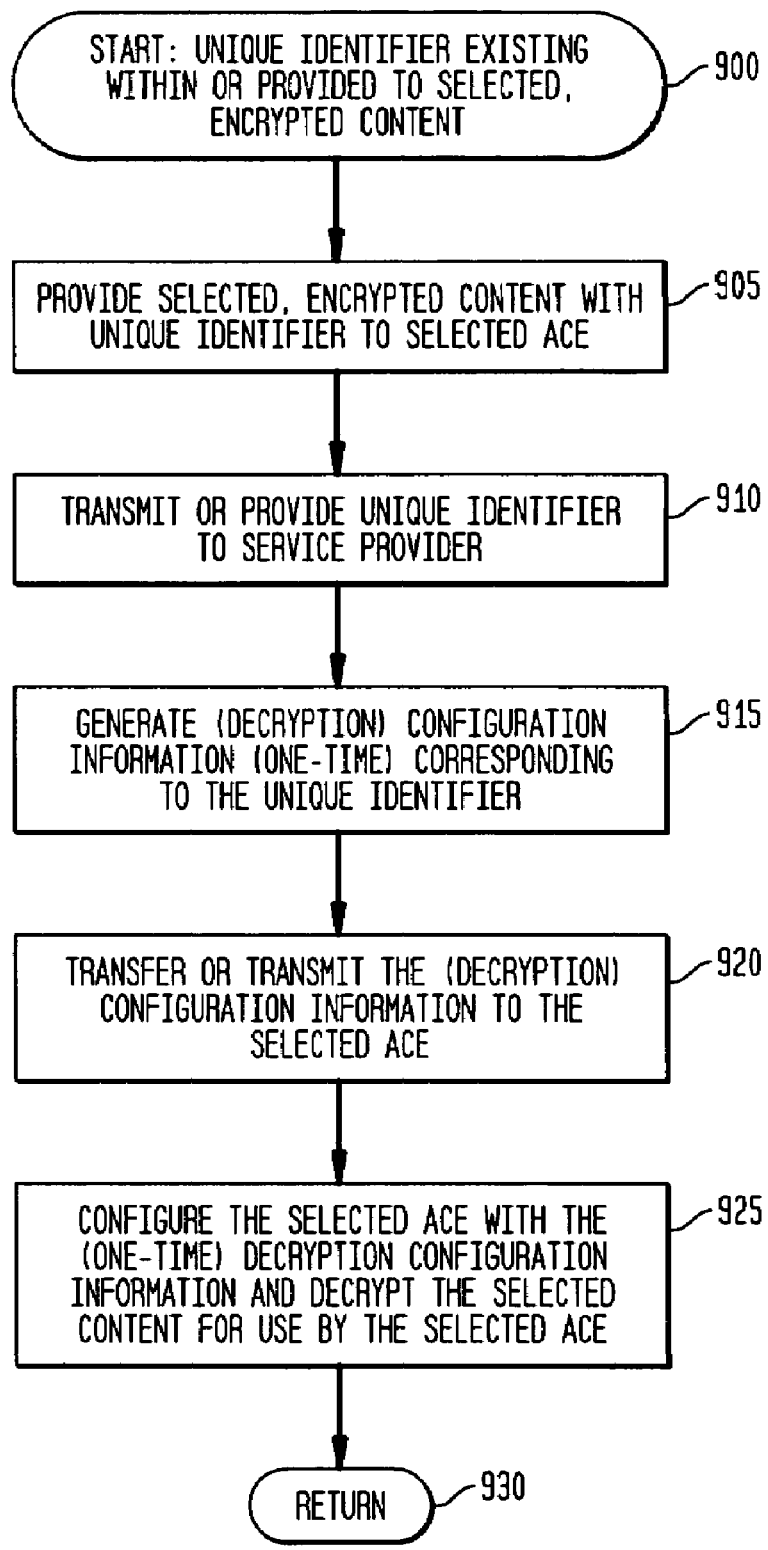
FIG. 11 is a flow diagram illustrating a second method embodiment in accordance with the present invention.

FIG. 10 is a flow diagram illustrating a first method embodiment in accordance with the present invention, and FIG. 11 is a flow diagram illustrating a second method embodiment in accordance with the present invention, and both Figures provide a useful summary of the present invention and its variations.

Referring to FIG. 10, the method begins, start step 800, with a unique identifier existing within or provided to an ACE 100. The unique identifier is transmitted or provided to a service provider, preferably with a request for corresponding, selected content, step 805, such as through a network 40. The service provider, such as a server 54 or application node 51, encrypts the corresponding, selected content, step 810, utilizing an encryption technology tied to or incorporating the unique identifier, such as a one-time pad or a public key encryption technique using a function, operator or other algorithm based upon the unique identifier. The service provider, or another entity, then generates configuration (adaptation) information, such as decryption configuration information, corresponding to the unique identifier and the encrypted content, step 815. As indicated above, in lieu of providing a decryption operating mode, the generated configuration information may also be used to provide a content operating mode specific to the selected content and the unique identifier. The encrypted content and corresponding configuration information is then provided to the ACE 100 having the unique identifier, step 820. In turn, step 825, the identified ACE 100 is configured, using the configuration information, such as the decryption configuration information or the content operating mode configuration information, and is thereby enabled to utilize the selected content, such as by decrypting the content or by having a content operating mode corresponding to the content. Following step 825, the method may end, return step 830.

Referring to FIG. 11, the method begins, start step 900, with a unique identifier existing within or provided to selected, correspondingly encrypted content. As indicated above, the corresponding, selected content has been encrypted utilizing an encryption technology tied to or incorporating the unique identifier, such as a one-time pad or a public key encryption technique using a function, operator or other algorithm based upon the unique identifier. The encrypted, selected content having the unique identifier is provided to a selected ACE (or, more simply, provided to the consumer having the selected ACE, such as via consumer selection of the content followed by a sales transaction at a store), step 905. The unique identifier is concurrently or subsequently transmitted or provided to a service provider, step 910, such as through a network 40. The service provider, or another entity, such as a server 54 or application node 51, then generates configuration (adaptation) information, such as decryption configuration information (designed for singular, one-time use), corresponding to the unique identifier and the encrypted content, step 915. As indicated above, in lieu of or in addition to providing a decryption operating mode, the generated configuration (adaptation) information may also be used to provide a content operating mode specific to the selected content and the unique identifier. The corresponding configuration (adaptation) information is then provided to the selected ACE 100, step 920. In turn, step 925, the identified ACE 100 is configured, using the configuration (adaptation) information, such as the decryption configuration information or the content operating mode configuration information, and is thereby enabled to utilize the selected content, such as by decrypting the content or by having a content operating mode corresponding to the content. Following step 925, the method may end, return step 930.

Numerous advantages of the various embodiments of the present invention are readily apparent. The present invention utilizes the capability to provide an operating mode to a "blank" ACE 100 independently of the actual provision of the ACE 100 itself. More particularly, while the present invention independently provides a configuration (adaptation) to a device for a selected device operating mode, the present invention provides a configuration or adaptation which is not independent from corresponding data or other content to be utilized by the device in the selected operating mode. The present invention provides this novel inseparability or marriage of the "hardware" (namely, the blank device and its configuration) with corresponding content or other data.

Various apparatuses, methods and systems have been illustrated for generating and providing this unique configuration (adaptation) information coupled with content for an ACE integrated circuit. As a consequence, both the content and the configuration of the particular ACE device are inherently non-transferable; namely, neither the content nor the configuration will operate or "play" on another device. As such, the present invention provides a technical methodology for, among other things, protection against unauthorized use and transmission of proprietary content, such as copyrighted music or performances.

Yet additional advantages of the present invention may be further apparent to those of skill in the art. The ACE 100 architecture of the present invention effectively and efficiently combines and maximizes the various advantages of processors, ASICs and FPGAs, while minimizing potential disadvantages. The ACE 100 includes the programming flexibility of a processor, the post-fabrication flexibility of FPGAs, and the high speed and high utilization factors of an ASIC. The ACE 100 is readily reconfigurable, in advance, in real-time or at other rates, and is capable of having corresponding, multiple modes of operation. In addition, through the selection of particular functions for reconfigurable acceleration, the ACE 100 minimizes power consumption and is suitable for low power applications, such as for use in hand-held and other battery-powered devices.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method for generating software for a device which is inseparable from selected content, the device having a unique identifier, the method comprising:
    (a) encrypting the selected content, based upon the unique identifier, to form encrypted content;
    (b) generating a plurality of executable instructions for the device corresponding to the unique identifier and the encrypted content, to form corresponding control information; and
    (c) transferring the encrypted content and the corresponding control information to the device having the unique identifier.

2. The method of claim 1, further comprising:
    (d) when the encrypted content and the corresponding control information is received by the device, using the corresponding control information, programming the device for use of the selected content.

3. The method of claim 1, wherein the corresponding control information is executable decryption instructions.

4. The method of claim 3, wherein the device is programmed to decrypt the encrypted content using the unique identifier.

5. The method of claim 1, wherein the corresponding control information is operating mode software.

6. The method of claim 1, wherein the unique identifier is at least one of the following unique identifiers: a serial number of the device or a public key.

7. The method of claim 1, wherein the encrypting step (a) utilizes one-time pad encryption or utilizes public key encryption.

8. A system for generating software for a device which is inseparable from selected content, the device having a unique identifier, the system comprising:
- an interface for transferring encrypted content and corresponding control information for transmission to the device having the unique identifier;
- a memory storing the unique identifier; and
- a processor coupled to the memory and to the interface, the processor adapted to encrypt the selected content, based upon the unique identifier, to form the encrypted content, and to generate a plurality of executable instructions for the device corresponding to the unique identifier and the encrypted content, to form the corresponding control information.

9. The system of claim 8, wherein the corresponding control information is executable decryption instructions.

10. The system of claim 8, wherein the corresponding control information is operating mode software.

11. The system of claim 8, wherein the unique identifier is at least one of the following unique identifiers: a serial number of the device or a public key.

12. The system of claim 8, wherein the processor is adapted to encrypt the selected content utilizing one-time pad encryption or utilizing public key encryption.

13. The system of claim 8, wherein the system is embodied in at least one of the following systems: a network server; an adjunct network entity; a computer; or an adaptive circuit.

14. An apparatus for utilizing selected content, the apparatus comprising:
- a memory adapted to store a unique identifier;
- an interface for receiving encrypted content and control information corresponding to the selected content and the unique identifier;
- a processor coupled to the memory and to the interface, the processor adapted to decrypt the encrypted content utilizing the corresponding control information and the unique identifier to form the selected content.

15. The apparatus of claim 14, wherein the corresponding control information is executable decryption instructions.

16. The apparatus of claim 14, wherein the corresponding control information is operating mode software.

17. The apparatus of claim 14, wherein the unique identifier is at least one of the following unique identifiers: a serial number of the device or a public key.

18. The apparatus of claim 14, wherein the apparatus is embodied in at least one of the following devices: an MP3 player; an MPEG decoder; a DVD player; a video player; a multimedia player; a television; a television cable receiver; a computer; or an adaptive circuit.

19. A method for generating software for a device which is inseparable from selected content, the selected content having been encrypted to form encrypted content, the encrypted content having a unique identifier, the method comprising:
- (a) receiving the unique identifier;
- (b) generating a plurality of executable instructions for the device corresponding to the unique identifier to form corresponding control information; and
- (c) transferring the corresponding control information to the device having the encrypted content with the unique identifier.

20. The method of claim 19, further comprising:
- (d) when the corresponding control information is received by the device, using the corresponding control information, programming the device for decryption of the encrypted content and use of the selected content.

21. An adaptive integrated circuit, the adaptive integrated circuit adapted to receive encrypted content and corresponding configuration information, the adaptive integrated circuit comprising:
- an interconnection network adapted to transfer the encrypted content and corresponding configuration information;
- a memory storing the unique identifier; and
- a plurality of computational elements coupled to the interconnection network and to the memory, the plurality of computational elements adapted, in response to the corresponding configuration information and the unique identifier, to configure for decryption of the encrypted content to form selected content and to configure for an operating mode to utilize the selected content.

22. An adaptive integrated circuit, the adaptive integrated circuit adapted to receive encrypted content and corresponding configuration information, the encrypted content having a unique identifier, the adaptive integrated circuit comprising:
- an interconnection network adapted to transfer the encrypted content and corresponding configuration information; and
- a plurality of computational elements coupled to the interconnection network, the plurality of computational elements adapted, in response to the corresponding configuration information and the unique identifier, to configure for decryption of the encrypted content to form selected content and to configure for an operating mode to utilize the selected content.

23. A method for encrypting an executable module, the executable module having control information combined with selected content, the control information for programming a device for a corresponding operating mode for use of the selected content, the method comprising:
- (a) receiving a request for the selected content and for the corresponding operating mode;
- (b) combining the selected content with control information to form the executable module, the control information for generating the corresponding operating mode; and
- (c) using a unique identifier, encrypting the executable module to form an encrypted executable module.

24. The method of claim 23, further comprising:
- (d) transferring the encrypted executable module to the device, the device having the unique identifier.

25. The method of claim 23, further comprising:
- (d) transferring the encrypted executable module and the unique identifier to the device.

26. The method of claim 23, further comprising:
- when the encrypted executable module is received by the device, decrypting the encrypted executable module; and
- using the control information, programming the device for the corresponding operating mode for use of the selected content.

27. The method of claim 26, wherein the control information is decryption software, and wherein the device is programmed to decrypt the encrypted executable module using the unique identifier.

* * * * *